(12) United States Patent
Yamamoto

(10) Patent No.: US 7,777,974 B2
(45) Date of Patent: Aug. 17, 2010

(54) MACRO LENS, OPTICAL APPARATUS, AND METHOD FOR MANUFACTURING THE MACRO LENS

(75) Inventor: Hiroshi Yamamoto, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/277,372

(22) Filed: Nov. 25, 2008

(65) Prior Publication Data
US 2009/0153980 A1 Jun. 18, 2009

(30) Foreign Application Priority Data

| Dec. 13, 2007 | (JP) | ............................. 2007-322323 |
| Dec. 13, 2007 | (JP) | ............................. 2007-322334 |
| Dec. 13, 2007 | (JP) | ............................. 2007-322340 |

(51) Int. Cl.
*G02B 9/12* (2006.01)

(52) U.S. Cl. ....................... 359/791; 359/784

(58) Field of Classification Search ......... 359/754–760, 359/763–769, 771–775, 779–780, 784–792
See application file for complete search history.

(56) References Cited

U.S. PATENT DOCUMENTS

| 5,519,540 A | 5/1996 | Suzuki |
| 5,598,299 A | 1/1997 | Hayakawa |
| 5,623,371 A | 4/1997 | Hankawa |
| 5,687,026 A | 11/1997 | Sato |
| 5,751,485 A | 5/1998 | Suzuki |
| 5,831,775 A | 11/1998 | Matsui |
| 5,946,136 A | 8/1999 | Suzuki |
| 6,014,266 A * | 1/2000 | Obama ........................ 359/689 |
| 6,124,990 A | 9/2000 | Suzuki |
| 7,009,779 B2 | 3/2006 | Arakawa |

FOREIGN PATENT DOCUMENTS

| JP | 58-34418 A | 2/1983 |
| JP | 06-130291 A | 5/1994 |
| JP | 06-308386 A | 11/1994 |
| JP | 11-281892 A | 10/1999 |
| JP | 2000-089113 A | 3/2000 |
| JP | 3141681 B2 | 12/2000 |
| JP | 3429562 B2 | 5/2003 |
| JP | 2003-185916 A | 7/2003 |
| JP | 2004-212692 A | 7/2004 |

OTHER PUBLICATIONS

Search Report and Opinion from European Application No. 08253798.

* cited by examiner

*Primary Examiner*—Darryl J Collins
(74) *Attorney, Agent, or Firm*—Miles & Stockbridge P.C.

(57) ABSTRACT

Providing a compact lens system having high optical performance over the entire focusing range from infinity to a close distance, an optical apparatus equipped therewith, a method for focusing the lens system, and a method for vibration reduction of the lens system. The lens system includes, in order from an object, a first lens group G1, a second lens group G2, and a third lens group G3. Combined refractive power of the first lens group G1 and the second lens group G2 is positive. The first lens group G1 and the second lens group G2 are movable to an object side for varying focusing from the object locating at infinity to the object locating at a close distance. Each lens group includes at least one positive lens and at least one negative lens. Given conditional expressions are satisfied.

21 Claims, 18 Drawing Sheets

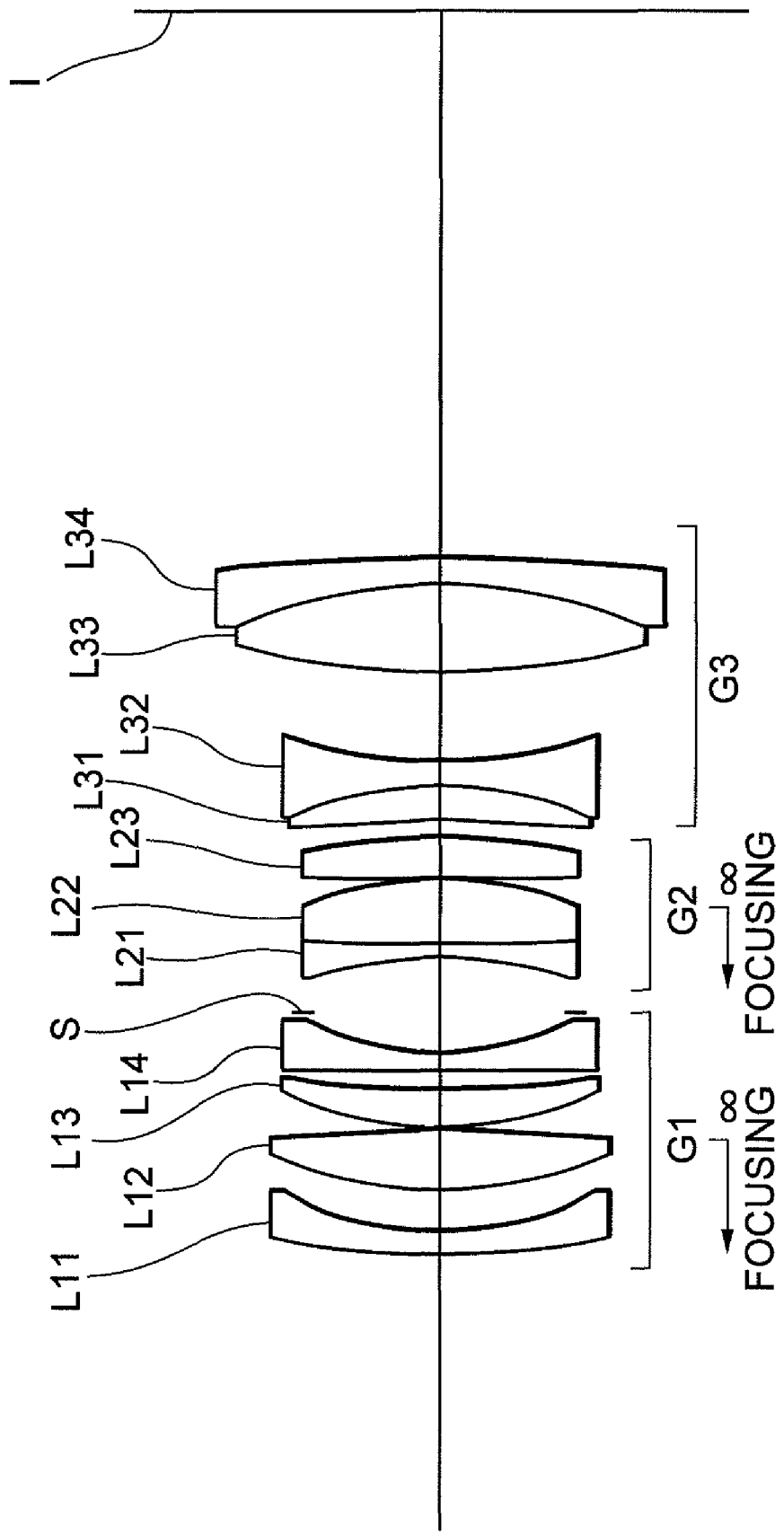

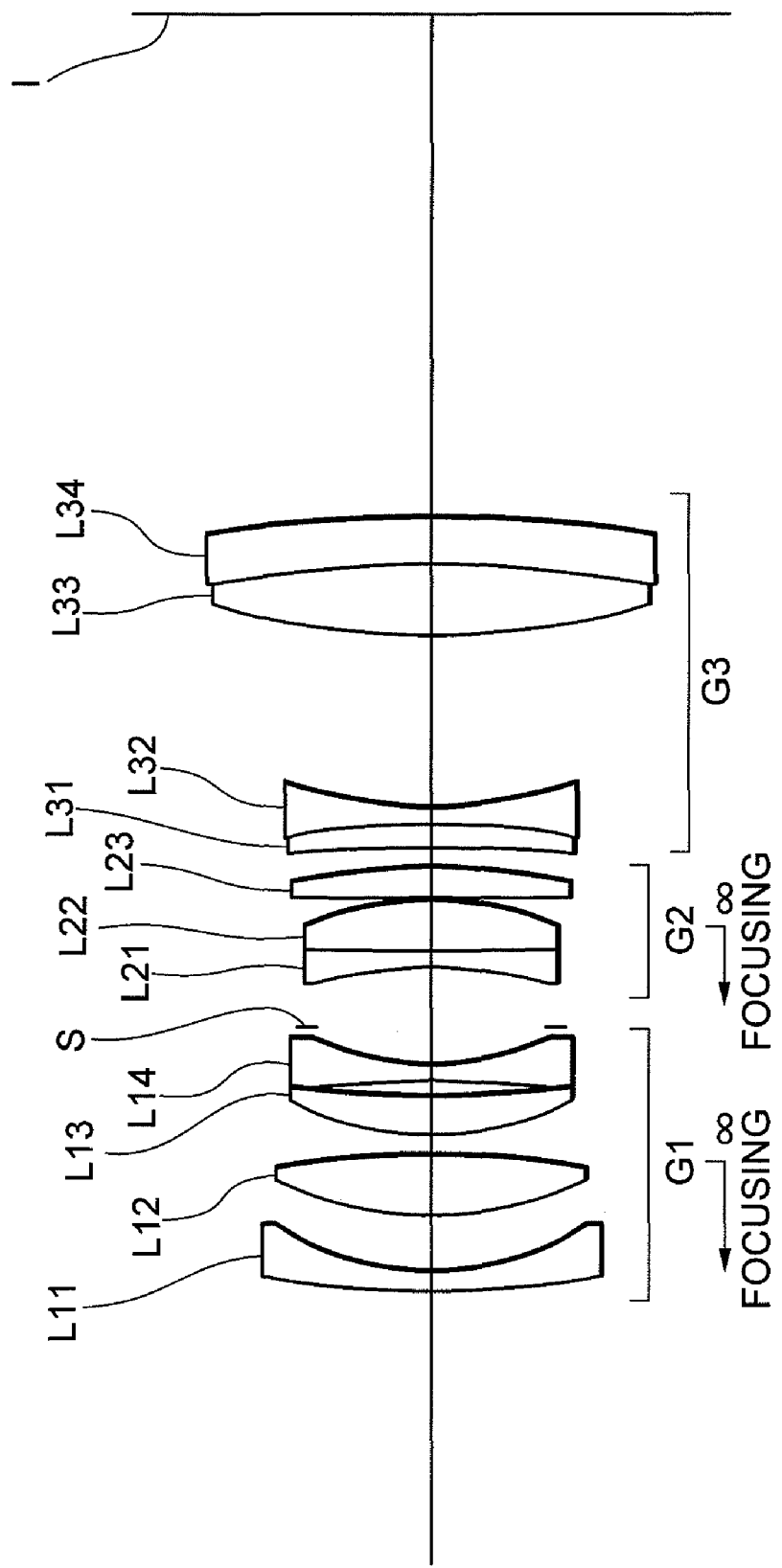

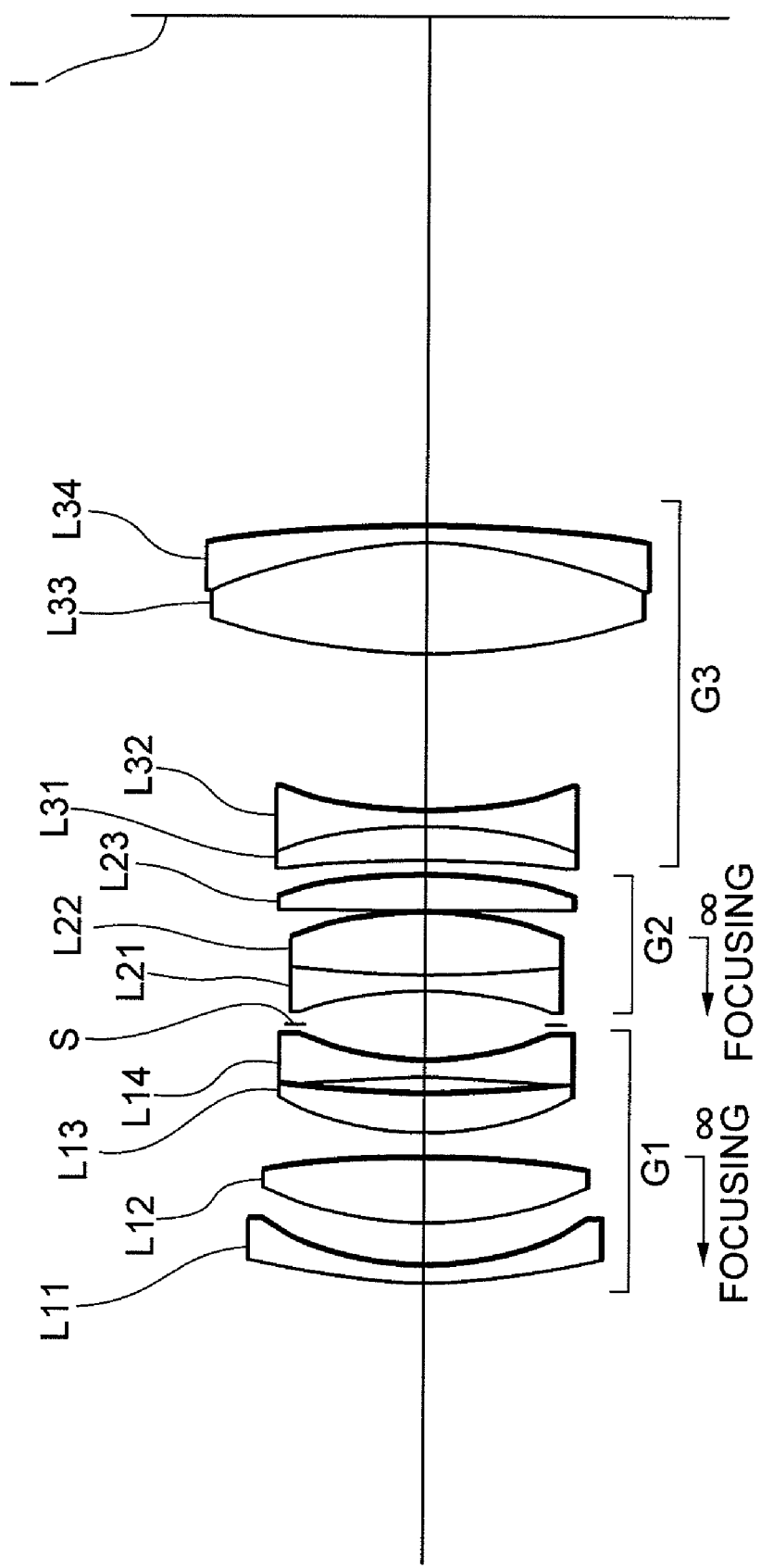

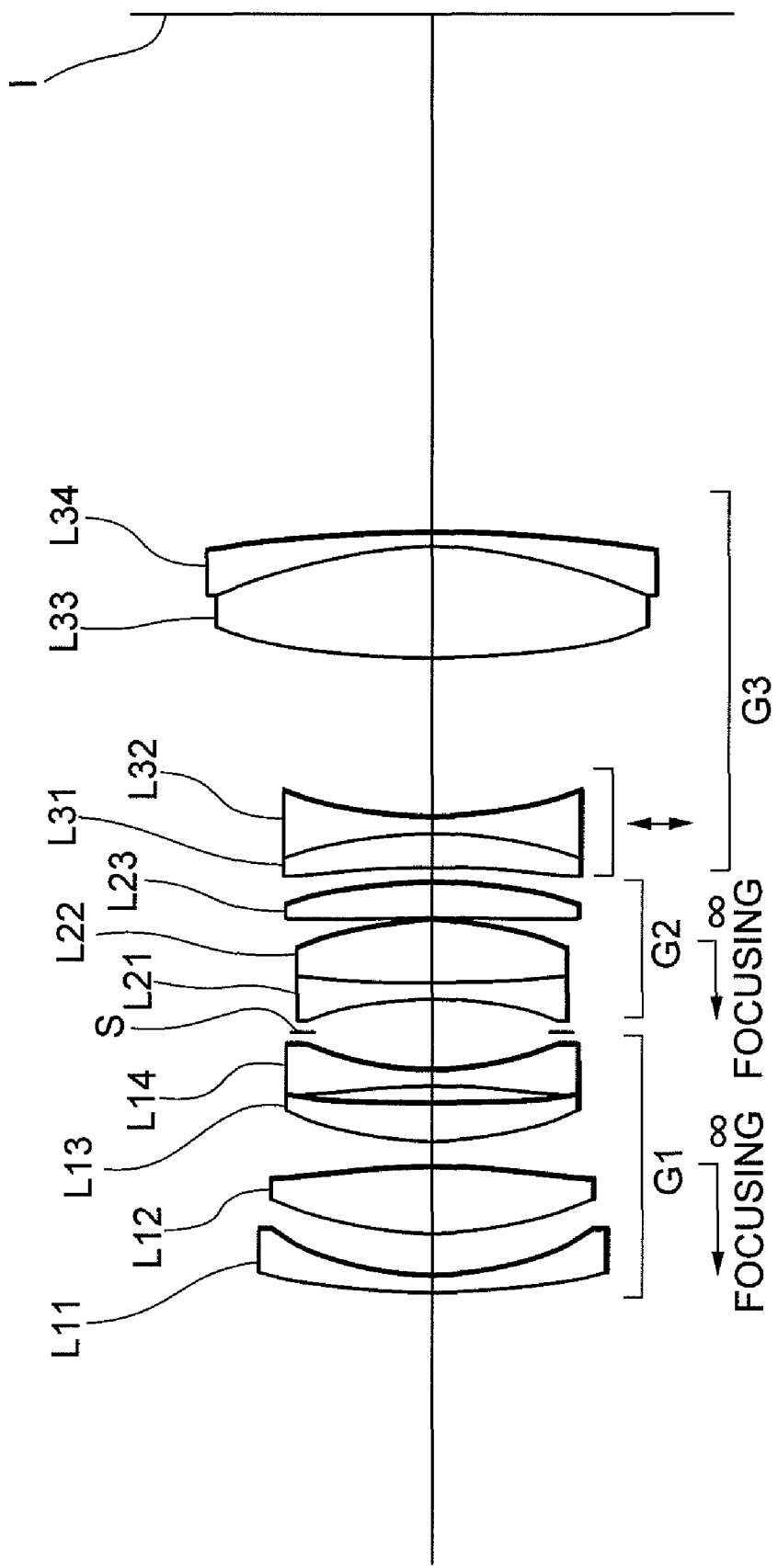

MACRO LENS, OPTICAL APPARATUS, AND METHOD FOR MANUFACTURING THE MACRO LENS

The disclosure of the following priority applications are herein incorporated by reference:

Japanese Patent Application No. 2007-322323 filed on Dec. 13, 2007;

Japanese Patent Application No. 2007-322334 filed on Dec. 13, 2007; and

Japanese Patent Application No. 2007-322340 filed on Dec. 13, 2007.

BACKGROUND OF THE INVENTION

1. Field of the Invention

The present invention relates to a macro lens suitable for a single-lens reflex camera and a digital camera, an optical apparatus using the macro lens, and a method for manufacturing the macro lens.

2. Related Background Art

There has been proposed a macros lens capable of taking a picture of an object locating at a position from infinity to a close distance such as Japanese Patent Publication No. 3429562. Moreover, there has been proposed a macro lens having a vibration reduction function such as Japanese Patent Publication No. 3141681.

However, since the conventional macro lens disclosed in Japanese Patent Publication No. 3429562 has a large moving amount for focusing, the lens barrel has become large, and optical performance has not been sufficient. Moreover, in the conventional macro lens disclosed in Japanese Patent Publication No. 3141681, optical performance over the entire focusing range from infinity to a close distance has not been sufficient, and optical performance upon vibration reduction has not been sufficient.

SUMMARY OF THE INVENTION

The present invention is made in view of the above-described problems, and has an object to provide a compact macro lens having high optical performance over the entire focusing range from infinity to a close distance, and a macro lens having a vibration reduction function with high optical performance even upon vibration reduction, an optical apparatus equipped therewith, a method for manufacturing the macro lens.

According to a first aspect of the present invention, there is provided a macro lens comprising, in order from an object: a first lens group; a second lens group; and a third lens group; combined refractive power of the first lens group and the second lens group being positive, the first lens group and the second lens group being movable to an object side for varying focusing from infinity to a close distance, each lens group including at least one positive lens and at least one negative lens, and the following conditional expressions (1) and (2) being satisfied:

$$0.40 < f12/f < 0.75 \qquad (1)$$

$$2.00 < f1/f2 < 8.00 \qquad (2)$$

where f denotes a focal length of the macro lens, f12 denotes a combined focal length of the first lens group and the second lens group upon focusing on the object locating at infinity, f1 denotes a focal length of the first lens group, and f2 denotes a focal length of the second lens group.

According to a second aspect of the present invention, there is provided an optical apparatus equipped with the macro lens according to the first aspect.

According to a third aspect of the present invention, there is provided a macro lens comprising, in order from an object: a first lens group; a second lens group; and a third lens group; combined refractive power of the first lens group and the second lens group being positive, the first lens group and the second lens group being movable to the object side for varying focusing from infinity to a close distance, at least a portion of the third lens group being movable in a direction perpendicular to an optical axis as a shift lens group, and the following conditional expression (5) being satisfied:

$$0.72 < |fvr|/f12 < 1.50 \qquad (5)$$

where f12 denotes a combined focal length of the first lens group and the second lens group upon focusing on the object locating at infinity, and fvr denotes a focal length of the shift lens group.

According to a fourth aspect of the present invention, there is provided an optical apparatus equipped with the macro lens according to the first aspect.

According to a fifth aspect of the present invention, there is provided a macro lens comprising, in order from an object: a first lens group;

a second lens group; and a third lens group; combined refractive power of the first lens group and the second lens group being positive, the first lens group and the second lens group being movable to the object side for varying focusing from infinity to a close distance, each lens group including at least one positive lens and at least one negative lens, and the following conditional expressions (3) and (2) being satisfied:

$$0.30 < X2/(f \times \beta) < 0.55 \qquad (3)$$

$$2.00 < f1/f2 < 8.00 \qquad (2)$$

where X2 denotes a moving amount of the second lens group upon varying focusing from infinity to the close distance in which X2 is positive upon moving to the image plane side, β denotes an imaging magnification upon focusing on the object locating at the close distance, f1 denotes a focal length of the first lens group, and f2 denotes a focal length of the second lens group.

According to a fifth aspect of the present invention, there is provided a method for manufacturing a macro lens that includes, in order from an object, a first lens group, a second lens group, and a third lens group, the method comprising steps of: disposing a positive lens and a negative lens in each lens group; disposing each lens in the first lens group and the second lens group in such manner that combined refractive power of the first lens group and the second lens group becomes positive, and each lens satisfies the following conditional expressions (1) and (2):

$$0.40 < f12/f < 0.75 \qquad (1)$$

$$2.00 < f1/f2 < 8.00 \qquad (2)$$

where f denotes a focal length of the macro lens, f12 denotes a combined focal length of the first lens group and the second lens group upon focusing on the object locating at infinity, f1 denotes a focal length of the first lens group, and f2 denotes a focal length of the second lens group; and disposing the first lens group and the second lens group movable upon varying focusing from infinity to a close distance.

According to a sixth aspect of the present invention, there is provided a method for manufacturing a macro lens that includes, in order from an object, a first lens group, a second lens group, and a third lens group, the method comprising steps of: disposing each lens in the first lens group and the second lens group in such manner that combined refractive power of the first lens group and the second lens group becomes positive, and each lens satisfies the following conditional expression (5):

$$0.72 < |fvr|/f12 < 1.50 \tag{5}$$

where f12 denotes a combined focal length of the first lens group and the second lens group upon focusing on the object locating at infinity, and fvr denotes a focal length of the shift lens group; and moving at least a portion of the third lens group in a direction perpendicular to an optical axis.

The present invention makes it possible to provide a compact macro lens having high optical performance over the entire focusing range from infinity to a close distance, and a macro lens having a vibration reduction function with high optical performance even upon vibration reduction, an optical apparatus equipped therewith, and a method for manufacturing the macro lens.

BRIEF DESCRIPTION OF THE DRAWINGS

FIG. 1 is a sectional view showing a lens configuration of a macro lens according to Example 1 of a first embodiment.

FIGS. 2A, and 2B are graphs showing various aberrations of the macro lens according to Example 1, in which FIG. 2A shows upon focusing on an object locating at infinity ($\beta$=0.00), and FIG. 2B shows upon focusing on an object locating at a close distance ($\beta$=−1.00).

FIG. 3 is a sectional view showing a lens configuration of a macro lens according to Example 2 of the first embodiment.

FIGS. 4A, and 4B are graphs showing various aberrations of the macro lens according to Example 2, in which FIG. 4A shows upon focusing on an object locating at infinity ($\beta$=0.00), and FIG. 4B shows upon focusing on an object locating at a close distance ($\beta$=−1.00).

FIG. 5 is a sectional view showing a lens configuration of a macro lens according to Example 3 of the first embodiment.

FIGS. 6A, and 6B are graphs showing various aberrations of the macro lens according to Example 3, in which FIG. 6A shows upon focusing on an object locating at infinity ($\beta$=0.00), and FIG. 6B shows upon focusing on an object locating at a close distance ($\beta$=−1.00).

FIGS. 8A, and 8B are graphs showing various aberrations of the macro lens according to Example 4, in which FIG. 8A shows upon focusing on an object locating at infinity ($\beta$=0.00), and FIG. 8B shows upon focusing on an object locating at a close distance ($\beta$=−1.00).

FIG. 9B shows upon correcting a rotational camera shake of 0.7 degrees upon focusing on an object locating at a close distance ($\beta$=−1.00).

FIGS. 11A, and 11B are graphs showing various aberrations of the macro lens according to Example 5, in which FIG. 11A shows upon focusing on an object locating at infinity ($\beta$=0.00), and FIG. 11B shows upon focusing on an object locating at a close distance ($\beta$=−1.00).

FIG. 12B shows upon correcting a rotational camera shake of 0.7 degrees upon focusing on an object locating at a close distance ($\beta$=−1.00).

FIG. 13 is a sectional view showing a lens configuration of a macro lens according to Example 6 of the second embodiment.

FIGS. 14A, and 14B are graphs showing various aberrations of the macro lens according to Example 6, in which FIG. 14A shows upon focusing on an object locating at infinity ($\beta$=0.00), and FIG. 14B shows upon focusing on an object locating at a close distance ($\beta$=−1.00).

FIG. 15B shows upon correcting a rotational camera shake of 0.7 degrees upon focusing on an object locating at a close distance ($\beta$=−1.00).

DESCRIPTION OF THE MOST PREFERRED EMBODIMENT

First Embodiment

Figure 2A:
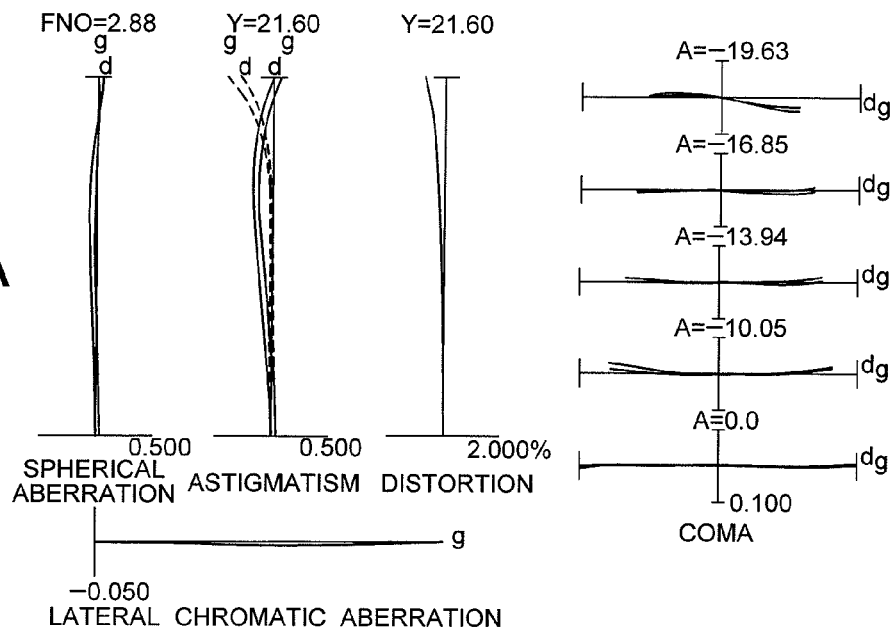

A macro lens according to a first embodiment is explained below.

A macro lens according to the first embodiment includes, in order from an object, a first lens group, a second lens group, and a third lens group. Combined refractive power of the first lens group and the second lens group is positive. Upon varying focusing from infinity to a close distance, the first lens group and the second lens group are moved to the object side.

With this configuration, it becomes possible to obtain excellent optical performance over the entire focusing range from infinity to a close distance with realizing compactness.

In a macro lens according to the first embodiment, each lens group includes at least one positive lens and at least one negative lens.

With this configuration, it becomes possible to excellently correct variation in chromatic aberration generated upon focusing.

In a macro lens according to the first embodiment, the following conditional expressions (1) and (2) are satisfied:

$$0.40 < f12/f < 0.75 \tag{1}$$

$$2.00 < f1/f2 < 8.00 \tag{2}$$

where f denotes the focal length of the macro lens, f12 denotes a combined focal length of the first lens group and the second lens group upon focusing on an object locating at infinity, f1 denotes a focal length of the first lens group, and f2 denotes a focal length of the second lens group.

Conditional expression (1) defines a ratio of the combined focal length of the first lens group and the second lens group with respect to the focal length of the macro lens.

When the ratio f12/f is equal to or exceeds the upper limit of conditional expression (1), the combined focal length of the first lens group and the second lens group becomes long, and a moving amount of the focusing lens group becomes long, so that variation in distortion upon focusing becomes large. On the other hand, when the ratio f12/f is equal to or falls below the lower limit of conditional expression (1), refractive power of the focusing lens group becomes large, so that it becomes difficult to correct spherical aberration and coma.

In order to secure the effect of the present embodiment, it is preferable to set the upper limit of conditional expression (1) to 0.74. In order to secure the effect of the present embodiment, it is preferable to set the lower limit of conditional expression (1) to 0.55.

Conditional expression (2) defines a ratio of the focal length of the first lens group to that of the second lens group.

With satisfying conditional expression (2), it becomes possible to excellently correct spherical aberration and coma over the entire focusing range from infinity to a close distance. When the ratio f1/f2 is equal to or falls below the lower limit of conditional expression (2) or equal to or exceeds the upper limit of conditional expression (2), it becomes difficult to correct spherical aberration and coma.

In order to secure the effect of the first embodiment, it is preferable to set the upper limit of conditional expression (2) to 7.00. In order to secure the effect of the first embodiment, it is preferable to set the lower limit of conditional expression (2) to 2.20.

In a macro lens according to the first embodiment, it is preferable that refractive power of the first lens group is positive, and refractive power of the second lens group is positive.

With this configuration, it becomes possible to obtain excellent optical performance over the entire focusing range from infinity to a close distance with realizing compactness.

In a macro lens according to the first embodiment, the following conditional expression (3) is preferably satisfied:

$$0.30 < X2/(f \times \beta) < 0.55 \quad (3)$$

where X2 denotes a moving amount of the second lens group upon varying focusing from infinity to a close distance, β denotes a imaging magnification upon focusing on an object locating at a close distance, where X2 is positive upon moving to the image plane side.

Conditional expression (3) defines the ratio of the moving amount of the second lens group to the focal length of the micro lens.

When the ratio $X2/(f \times \beta)$ is equal to or exceeds the upper limit of conditional expression (3), the moving amount of the second lens group increases, and variation in distortion upon focusing increases. On the other hand, when the ratio $X2/(f \times \beta)$ is equal to or falls below the lower limit of conditional expression (3), and when the moving amount of the second lens group decreases, refractive power of the focusing lens group becomes large, so that it becomes difficult to correct spherical aberration and coma.

In order to secure the effect of the first embodiment, it is preferable to set the upper limit of conditional expression (3) to 0.52. In order to secure the effect of the first embodiment, it is preferable to set the lower limit of conditional expression (3) to 0.36.

In a macro lens according to the first embodiment, refractive power of the third lens group is preferably negative.

With this configuration, it becomes possible to obtain excellent optical performance over the entire focusing range from infinity to a close distance with realizing compactness.

In a macro lens according to the first embodiment, the third lens group preferably includes, in order from the object, a front lens group having negative refractive power, and a rear lens group having positive refractive power.

With this configuration, it becomes possible to suppress shading caused by an imaging device by making a position of an exit pupil away from the image plane.

In a macro lens according to the first embodiment, the front lens group preferably includes a cemented negative lens constructed by a positive lens cemented with a negative lens.

With this configuration, it becomes possible to excellently correct longitudinal and lateral chromatic aberrations.

In a macro lens according to the first embodiment, the third lens group preferably includes an aspherical surface.

With including an aspherical surface into the third lens group, it becomes possible to excellently correct spherical aberration and coma with increasing refractive power of the negative lens.

In a macro lens according to the first embodiment, the following conditional expression (4) is preferably satisfied:

$$1.00 \leq X1/X2 < 1.30 \quad (4)$$

where X1 denotes a moving amount of the first lens group upon varying focusing from infinity to a close distance, and X2 denotes a moving amount of the second lens group upon varying focusing from infinity to a close distance, in which X1 and X2 are positive upon moving to the image plane side.

Conditional expression (4) defines an appropriate range of the ratio of the moving amount of the first lens group to that of the second lens group.

With satisfying conditional expression (4), it becomes possible to excellently correct variation in curvature of field caused by focusing. When the ratio X1/X2 falls below the lower limit of conditional expression (4) or is equal to or exceeds the upper limit of conditional expression (4), it becomes difficult to correct variation in curvature of field.

In order to secure the effect of the first embodiment, it is preferable to set the upper limit of conditional expression (4) to 1.20.

In a macro lens according to the first embodiment, the first lens group preferably includes the negative lens to the most object side.

With this configuration, it becomes possible to obtain excellent optical performance with securing sufficient distance between the second lens group and the third lens group.

In a macro lens according to the first embodiment, an aperture stop is preferably disposed between the first lens group and the third lens group.

With this configuration, it becomes possible to obtain excellent optical performance over the entire aperture state from a full-open state to a stop-down state.

A macro lens according to the first embodiment includes, in order from an object, a first lens group, a second lens group, and a third lens group. Combined refractive power of the first lens group and the second lens group is positive. Upon varying focusing from infinity to a close distance, the first lens group and the second lens group are moved to the object side. Each lens group includes at least one positive lens and at least one negative lens. The following conditional expressions (3) and (2) are satisfied:

$$0.30 < X2/(f \times \beta) < 0.55 \quad (3)$$

$$2.00 < f1/f2 < 8.00 \quad (2)$$

where f denotes a focal length of the macro lens, X2 denotes a moving amount of the second lens group upon varying focusing from infinity to a close distance, β denotes an imaging magnification upon focusing on an object locating at a close distance, f1 denotes a focal length of the first lens group, and f2 denotes a focal length of the second lens group, where X2 is positive upon moving to the image plane side.

Conditional expression (3) defines the ratio of the moving amount of the second lens group to the focal length of the micro lens. However, conditional expression (3) has already explained above, so that duplicated explanations are omitted.

Conditional expression (2) defines a ratio of the focal length of the first lens group to that of the second lens group. However, conditional expression (2) has already explained above, so that duplicated explanations are omitted.

Each example according to the first embodiment is explained below with reference to accompanying drawings.

Example 1

FIG. 1 is a sectional view showing a lens configuration of a macro lens according to Example 1 of the first embodiment.

The macro lens according to Example 1 is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a negative meniscus lens L14 having a convex surface facing the object.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

Various values associated with the macro lens according to Example 1 are listed in Table 1.

In [Specifications], f denotes a focal length of the macro lens, FNO denotes an f-number, 2ω denotes an angle of view in degrees, Y denotes an image height, and TL denotes a total lens length.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "vd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Aspherical Data], an aspherical surface is exhibited by the following expression:

$$X(y) = (y^2/r)/[1+[1-\kappa(y^2/r^2)]^{1/2}] + A4 \times y^4 + A6 \times y^6 + A8 \times y^8 + A10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), K denotes a conical coefficient, An denotes an aspherical coefficient of n-th order, "E-n" denotes "$\times 10^{-n}$", for example, "1.234E-05" denotes "$1.234 \times 10^{-5}$" and the position of an aspherical surface is expressed by attaching "*" to the right side of the surface number.

In [Variable Distances], "Infinity" denotes a case upon focusing on an object locating at infinity, "Close Distance" denotes a case focusing on an object locating at a close distance, Di denotes a variable distance at the surface number i, β denotes an imaging magnification, and Bf denotes a back focal length.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

| [Specifications] | | | |
|---|---|---|---|
| f = 61.00 | | | |
| FNO = 2.88 | | | |
| 2ω = 39.20 | | | |
| Y = 21.60 | | | |
| TL = 91.29 | | | |

| [Lens Data] | | | | |
|---|---|---|---|---|
| i | r | d | nd | vd |
| 1 | 52.577 | 1.60 | 1.75500 | 52.29 |
| 2 | 20.990 | 3.00 | | |
| 3 | 25.493 | 4.50 | 1.81600 | 46.63 |
| 4 | −131.416 | 0.10 | | |
| 5 | 22.565 | 2.80 | 1.65160 | 58.54 |
| 6 | 56.814 | 1.50 | | |
| 7 | 638.364 | 1.10 | 1.62004 | 36.30 |
| 8 | 17.844 | (D8) | | |
| 9 | ∞ | 4.00 | Aperture Stop S | |
| 10 | −28.971 | 1.00 | 1.72825 | 28.46 |
| 11 | 182.076 | 4.80 | 1.69680 | 55.52 |
| 12 | −25.710 | 0.10 | | |
| 13 | 527.863 | 2.90 | 1.71700 | 47.93 |
| 14 | −49.997 | (D14) | | |
| 15 | −152.015 | 2.50 | 1.84666 | 23.78 |
| 16 | −29.039 | 2.00 | 1.80400 | 46.58 |
| 17* | 31.559 | 6.50 | | |
| 18 | 50.834 | 6.50 | 1.80400 | 46.58 |
| 19 | −37.670 | 2.00 | 1.84666 | 23.78 |
| 20 | −145.491 | (Bf) | | |

[Aspherical Data]
Surface Number: 17

κ = 1.0000

TABLE 1-continued

A4 = −2.47160E−06
A6 = −1.42350E−09
A8 = 0.00000E+00
A10 = 0.00000E+00

[Variable Distances]

|  | Infinity | Close Distance |
|---|---|---|
| β = | 0.00 | −1.00 |
| D8 = | 3.20 | 6.08 |
| D14 = | 1.20 | 30.32 |
| Bf = | 40.00 | 40.00 |

[Values for Conditional Expressions]

(1): f12/f = 0.69
(2): f1/f2 = 2.43
(3): X2/(f × β) = 0.48
(4): X1/X2 = 1.10

Figure 2B:
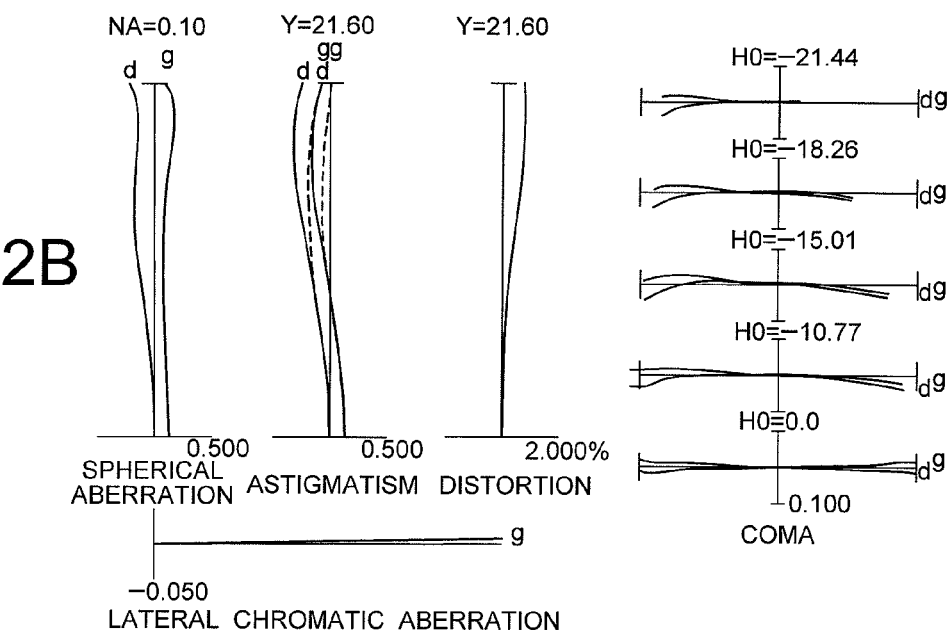

FIGS. 2A, and 2B are graphs showing various aberrations of the macro lens according to Example 1, in which FIG. 2A shows upon focusing on an object locating at infinity (β=0.00), and FIG. 2B shows upon focusing on an object locating at a close distance (β=−1.00).

In respective graphs, FNO denotes an f-number, Y denotes an image height, and A denotes an incident angle of a principal ray in degrees. NA denotes a numerical aperture, and H0 denotes an object height. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane.

The above-described explanations regarding various aberration graphs are the same as the other Examples.

As is apparent from the respective graphs, the macro lens according to Example 1 shows superb optical performance as a result of good corrections to various aberrations.

Example 2

FIG. 3 is a sectional view showing a lens configuration of a macro lens according to Example 2 of the first embodiment.

The macro lens according to Example 2 is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a double concave negative lens L14.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

Various values associated with the macro lens according to Example 2 are listed in Table 2.

TABLE 2

[Specifications]

f = 62.00
FNO = 3.05
2ω = 38.80
Y = 21.60
TL = 96.29

[Lens Data]

| i | r | d | nd | νd |
|---|---|---|---|---|
| 1 | 77.161 | 1.20 | 1.62280 | 57.03 |
| 2 | 21.083 | 4.36 |  |  |
| 3 | 26.415 | 4.45 | 1.83400 | 37.17 |
| 4 | −94.687 | 1.59 |  |  |
| 5 | 23.149 | 2.88 | 1.60300 | 65.47 |
| 6 | 74.335 | 1.19 |  |  |
| 7 | −116.105 | 1.20 | 1.72825 | 28.46 |
| 8 | 20.056 | (D8) |  |  |
| 9 | ∞ | 4.47 | Aperture Stop S |  |
| 10 | −38.008 | 1.20 | 1.78472 | 25.68 |
| 11 | 155.775 | 3.83 | 1.79500 | 45.30 |
| 12 | −28.126 | 0.20 |  |  |
| 13 | 317.461 | 2.26 | 1.81600 | 46.63 |
| 14 | −61.987 | (D14) |  |  |
| 15 | −209.108 | 1.84 | 1.84666 | 23.78 |
| 16 | −71.146 | 1.20 | 1.69680 | 55.52 |
| 17* | 30.031 | 13.06 |  |  |
| 18 | 51.485 | 5.55 | 1.62280 | 57.03 |
| 19 | −102.566 | 3.38 | 1.84666 | 23.78 |
| 20 | −155.457 | (Bf) |  |  |

[Aspherical Data]
Surface Number: 17

κ = 0.9487
A4 = −3.33720E−06
A6 = −4.30430E−09
A8 = 9.75350E−11
A10 = −5.93050E−13

[Variable Distances]

|  | Infinity | Close Distance |
|---|---|---|
| β = | 0.00 | −1.00 |
| D8 = | 2.92 | 6.00 |
| D14 = | 1.50 | 27.22 |
| Bf = | 38.00 | 38.00 |

[Values for Conditional Expressions]

(1): f12/f = 0.64
(2): f1/f2 = 5.55
(3): X2/(f × β) = 0.41
(4): X1/X2 = 1.12

Figure 4A:
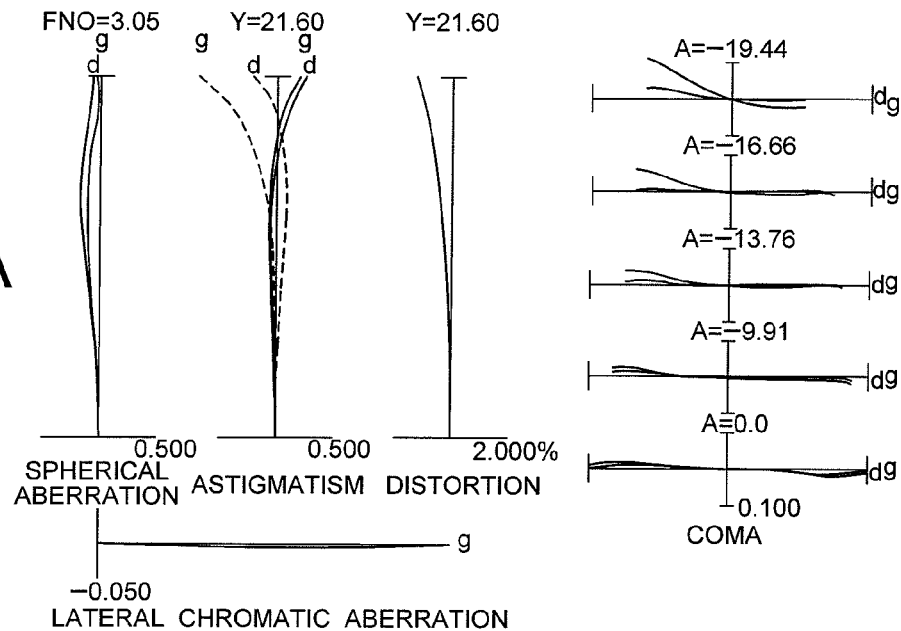
Figure 4B:
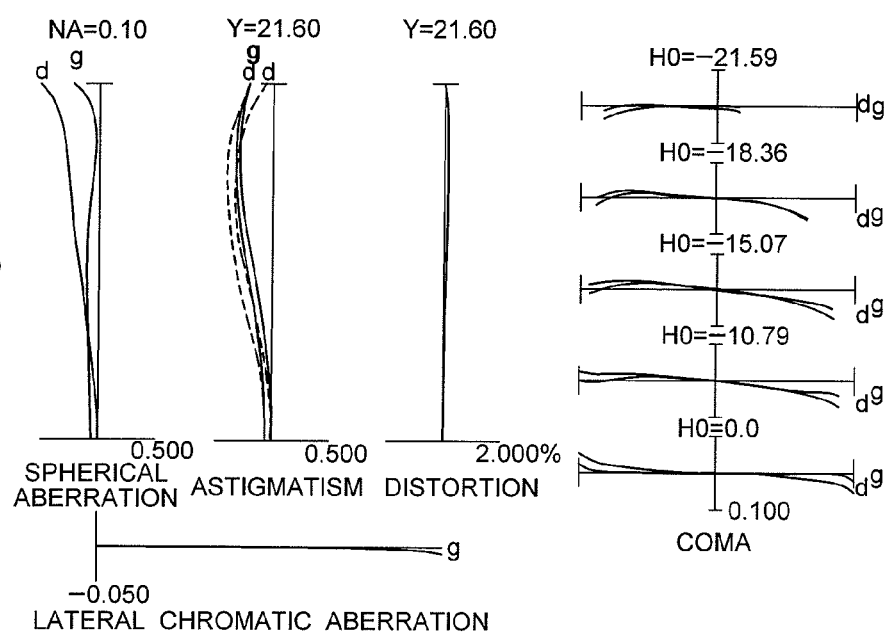

FIGS. 4A, and 4B are graphs showing various aberrations of the macro lens according to Example 2, in which FIG. 4A shows upon focusing on an object locating at infinity (β=0.00), and FIG. 4B shows upon focusing on an object locating at a close distance (β=−1.00).

As is apparent from the respective graphs, the macro lens according to Example 2 shows superb optical performance as a result of good corrections to various aberrations.

Example 3

FIG. 5 is a sectional view showing a lens configuration of a macro lens according to Example 3 of the first embodiment.

The macro lens according to Example 3 is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a double concave negative lens L14.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

Various values associated with the macro lens according to Example 3 are listed in Table 3.

TABLE 3

[Specifications]

f = 62.20
FNO = 2.94
2ω = 38.70
Y = 21.60
TL = 95.55

[Lens Data]

| i | r | d | nd | νd |
|---|---|---|---|---|
| 1 | 50.155 | 1.20 | 1.81554 | 44.35 |
| 2 | 21.627 | 3.13 | | |
| 3 | 26.048 | 4.97 | 1.80440 | 39.57 |
| 4 | −92.734 | 1.95 | | |
| 5 | 24.946 | 2.82 | 1.60300 | 65.47 |
| 6 | 76.300 | 1.29 | | |
| 7 | −105.025 | 1.20 | 1.64769 | 33.79 |
| 8 | 21.392 | (D8) | | |
| 9 | ∞ | 2.38 | Aperture Stop S | |
| 10 | −28.665 | 1.20 | 1.72825 | 28.46 |
| 11 | 67.540 | 4.74 | 1.67790 | 50.70 |
| 12 | −26.943 | 0.20 | | |
| 13 | 644.209 | 2.60 | 1.78590 | 44.18 |
| 14 | −40.340 | (D14) | | |
| 15 | −136.790 | 2.62 | 1.75520 | 27.51 |
| 16 | −36.281 | 1.20 | 1.65100 | 56.17 |
| 17* | 29.881 | 11.92 | | |
| 18 | 49.534 | 8.38 | 1.63854 | 55.48 |
| 19 | −40.027 | 1.20 | 1.75692 | 31.59 |
| 20 | −133.204 | (Bf) | | |

TABLE 3-continued

[Aspherical Data]
Surface Number: 17

κ = 1.0423
A4 = −2.06620E−06
A6 = −1.82980E−08
A8 = 1.10000E−10
A10 = −2.62190E−13

[Variable Distances]

| | Infinity | Close Distance |
|---|---|---|
| β = | 0.00 | −1.00 |
| D8 = | 2.96 | 4.71 |
| D14 = | 1.10 | 28.53 |
| Bf = | 38.50 | 38.50 |

[Values for Conditional Expressions]

(1): f12/f = 0.66
(2): f1/f2 = 3.69
(3): X2/(f × β) = 0.44
(4): X1/X2 = 1.06

Figure 6A:
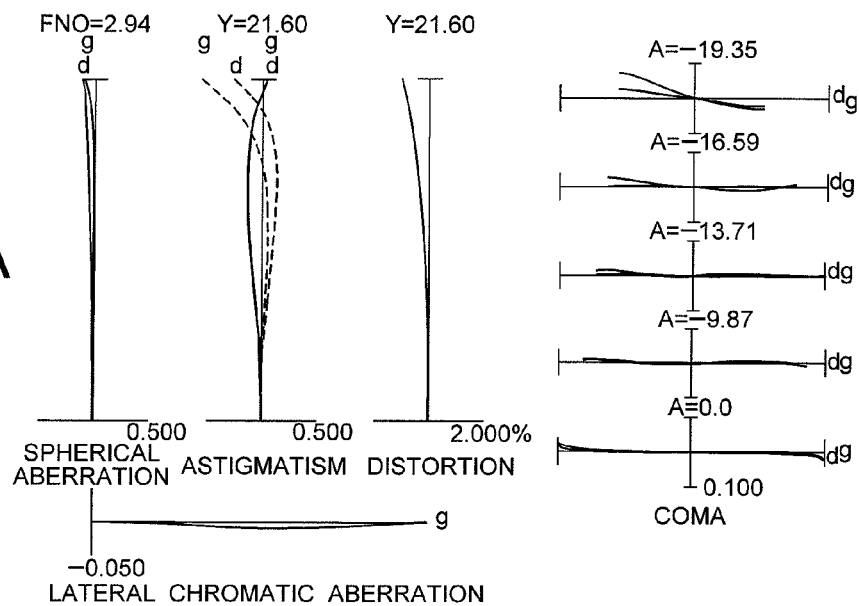
Figure 6B:
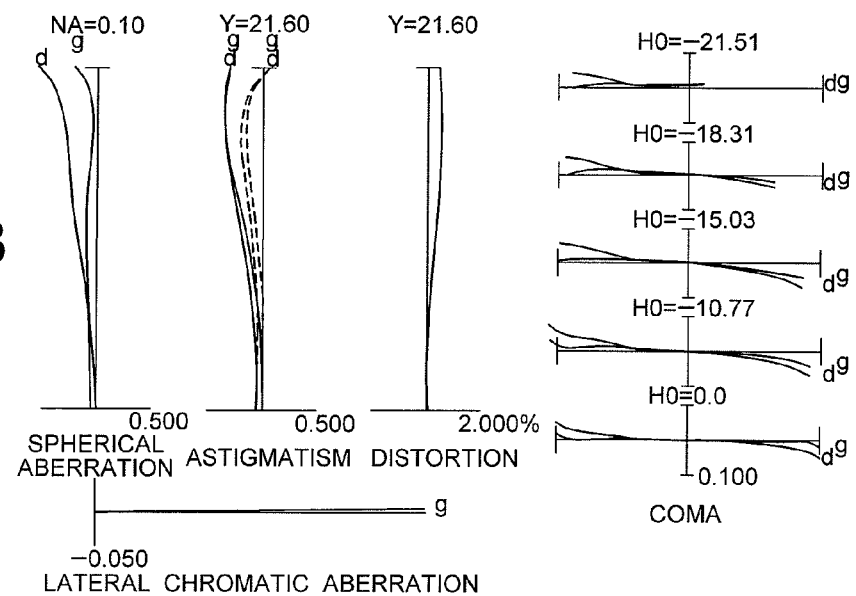

FIGS. 6A and 6B are graphs showing various aberrations of the macro lens according to Example 3, in which FIG. 6A shows upon focusing on an object locating at infinity (β=0.00), and FIG. 6B shows upon focusing on an object locating at a close distance (β=−1.00).

As is apparent from the respective graphs, the macro lens according to Example 3 shows superb optical performance as a result of good corrections to various aberrations.

Figure 17:
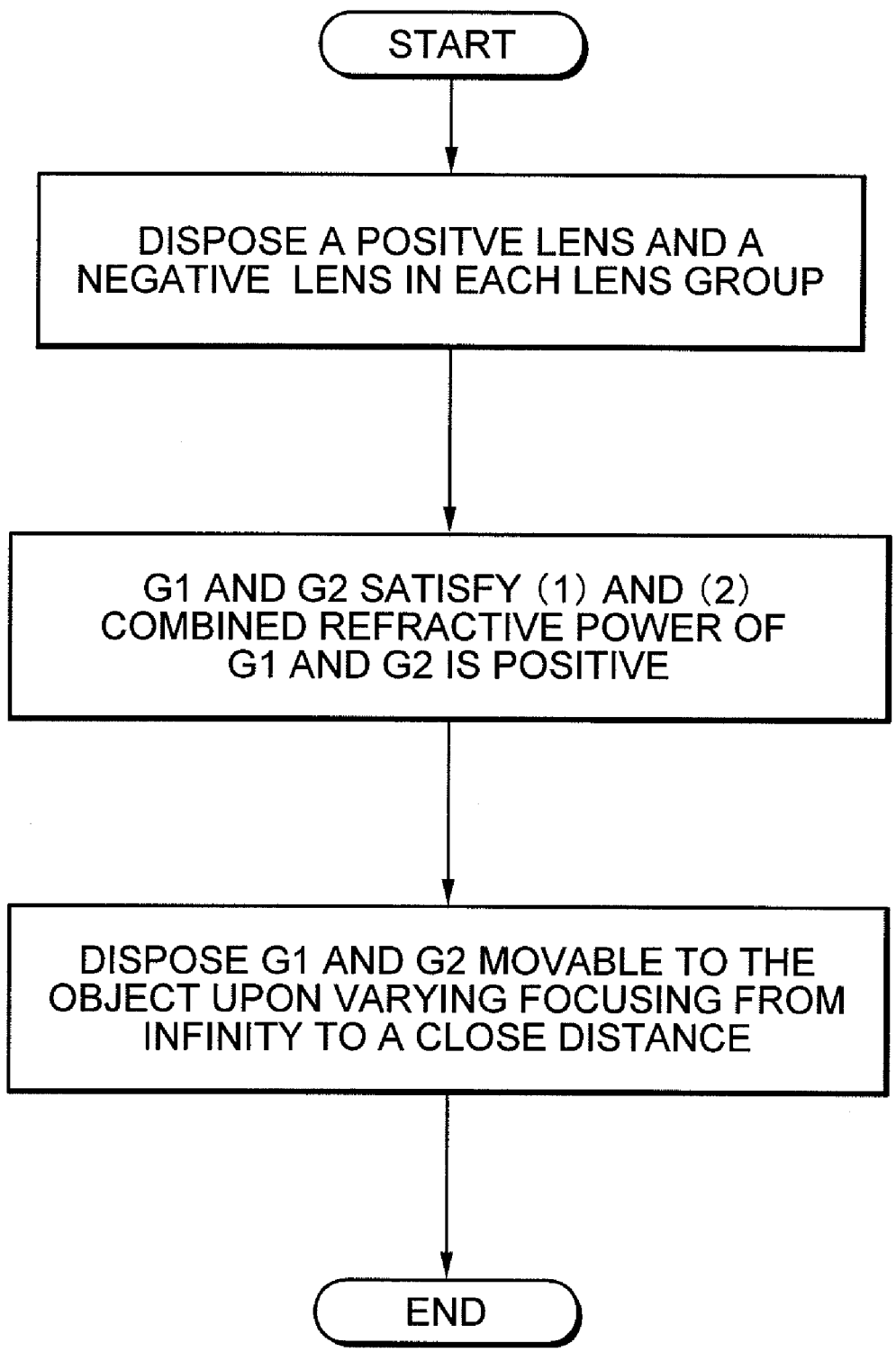
FIG. 17 is a flow chart showing a procedure of a method for manufacturing the macro lens according to the first embodiment.

An outline of a method for manufacturing the macro lens including, in order from an object, a first lens group G1, a second lens group G2, and a third lens group G3 is explained below with reference to FIG. 17.

At first, a positive lens and a negative lens are disposed each of the first lens group G1, the second lens group G2, and the third lens group G3, and each lens group is disposed in a lens barrel having cylindrical shape.

Then, the first lens group G1 and the second lens group G2 are disposed in such a manner that combined refractive power of the first lens group G1 and the second lens group G2 is positive, and the following conditional expressions (1) and (2) are satisfied:

$$0.40 < f12/f < 0.75 \tag{1}$$

$$2.00 < f1/f2 < 8.00 \tag{2}$$

where f denotes the focal length of the macro lens, f12 denotes a combined focal length of the first lens group and the second lens group upon focusing on an object locating at infinity, f1 denotes a focal length of the first lens group, and f2 denotes a focal length of the second lens group.

Then, the first lens group G1 and the second lens group G2 are disposed movable to the object side upon varying focusing from infinity to a close distance.

As described above, the first embodiment makes it possible to provide a compact macro lens having high optical performance over the entire focusing range from infinity to a close distance suitable for a single-lens reflex camera and a digital camera.

Second Embodiment

A macro lens according to a second embodiment of the present application is explained below.

A macro lens according to the second embodiment includes, in order from an object, a first lens group, a second lens group, and a third lens group. Combined refractive power of the first lens group and the second lens group is positive. Upon varying focusing from infinity to a close distance, the first lens group and the second lens group are moved to the object side.

With this configuration, it becomes possible to obtain excellent optical performance over the entire focusing range from infinity to a close distance.

In a macro lens according to the second embodiment, at least a portion of the third lens group is moved in a direction perpendicular to an optical axis as a shift lens group.

With this configuration, it becomes possible to obtain excellent optical performance even upon vibration reduction.

In a macro lens according to the second embodiment, the following conditional expression (5) is satisfied:

$$0.72 < |fvr|/f12 < 1.50 \quad (5)$$

where f12 denotes a combined focal length of the first lens group and the second lens group upon focusing on an object locating at infinity, and fvr denotes a focal length of the shift lens group.

Conditional expression (5) defines a ratio of the focal length of the shift lens group to the combined focal length of the first lens group and the second lens group.

When the ratio |fvr|/f12 is equal to or exceeds the upper limit of conditional expression (5), the combined focal length of the first lens group and the second lens group becomes small, so that it becomes difficult to excellently correct variation in spherical aberration and coma upon focusing. On the other hand, when the ratio |fvr|/f12 is equal to or falls below the lower limit of conditional expression (5), refractive power of the shift lens group becomes large, so that it becomes difficult to excellently correct decentered coma and inclination of the image plane upon vibration reduction.

In order to secure the effect of the second embodiment, it is preferable to set the upper limit of conditional expression (5) to 1.30. In order to secure the effect of the second embodiment, it is preferable to set the lower limit of conditional expression (5) to 0.84.

In a macro lens according to the second embodiment, it is preferable that refractive power of the first lens group is positive, and that of the second lens group is positive.

With this configuration, it becomes possible to obtain excellent optical performance over the entire focusing rang from infinity to a close distance.

In a macro lens according to the second embodiment, the following conditional expression (6) is satisfied:

$$0.83 < D/f < 1.40 \quad (6)$$

where f denotes a focal length of the macro lens, and D denotes a distance between the most object side lens surface of the shift lens group and the image plane.

Conditional expression (6) defines a ratio of the focal length of the macro lens to the distance between the shift lens group and the image plane.

With satisfying conditional expression (6), it becomes possible to excellently correct decentered coma and inclination of the image plane upon vibration reduction. When the ratio D/f is equal to or exceeds the upper limit of conditional expression (6), or is equal to or falls below the lower limit of conditional expression (6), it becomes difficult to correct decentered coma and inclination of the image plane.

In order to secure the effect of the second embodiment, it is preferable to set the upper limit of conditional expression (6) to 1.20. In order to secure the effect of the second embodiment, it is preferable to set the lower limit of conditional expression (6) to 0.87.

In a macro lens according to the second embodiment, refractive power of the third lens group is preferably negative.

With this configuration, it becomes possible to obtain excellent optical performance over the entire focusing range from infinity to a close distance with realizing compactness.

In a macro lens according to the second embodiment, refractive power of the shift lens group in the third lens group is preferably negative.

With this configuration, it becomes possible to suppress variation in decentered coma upon moving the shift lens group in a direction perpendicular to the optical axis.

In a macro lens according to the second embodiment, the third lens group preferably includes, in order from the object, a front lens group having negative refractive power, and a rear lens group having positive refractive power.

With this configuration, it becomes possible to suppress shading of the imaging device by disposing the position of the exit pupil away from the image plane.

In a macro lens according to the second embodiment, the front lens group preferably includes a cemented negative lens constructed by a positive lens cemented with a negative lens.

With this configuration, it becomes possible to excellently correct longitudinal and lateral chromatic aberrations.

In a macro lens according to the second embodiment, the third lens group preferably includes an aspherical surface.

With including an aspherical surface into the third lens group, it becomes possible to excellently correct spherical aberration and curvature of field with enhancing negative refractive power.

In a macro lens according to the second embodiment, the shift lens group in the third lens group preferably has an aspherical surface.

With this configuration, it becomes possible to suppress variation in coma upon vibration reduction.

In a macro lens according to the second embodiment, the following conditional expression (4) is preferably satisfied:

$$1.00 \leq X1/X2 < 1.30 \quad (4)$$

where X1 denotes a moving amount of the first lens group upon varying focusing from infinity to a close distance, and X2 denotes a moving amount of the second lens group upon varying focusing from infinity to a close distance, in which X1 and X2 are positive upon moving to the image plane side.

Conditional expression (4) defines an appropriate range of the ratio of the moving amount of the first lens group to that of the second lens group. However, conditional expression (4) has already been explained above, so that duplicated explanations are omitted.

In a macro lens according to the second embodiment, the first lens group preferably includes a negative lens to the most object side.

With this configuration, it becomes possible to obtain excellent optical performance with securing sufficient distance between the second lens group and the third lens group.

In a macro lens according to the second embodiment, an aperture stop is preferably disposed between the first lens group and the third lens group.

With this configuration, it becomes possible to obtain excellent optical performance over the entire aperture state from a full-open state to a stop-down state.

Each example 1 according to the second embodiment is explained below with reference to accompanying drawings.

Example 4

Figure 7:
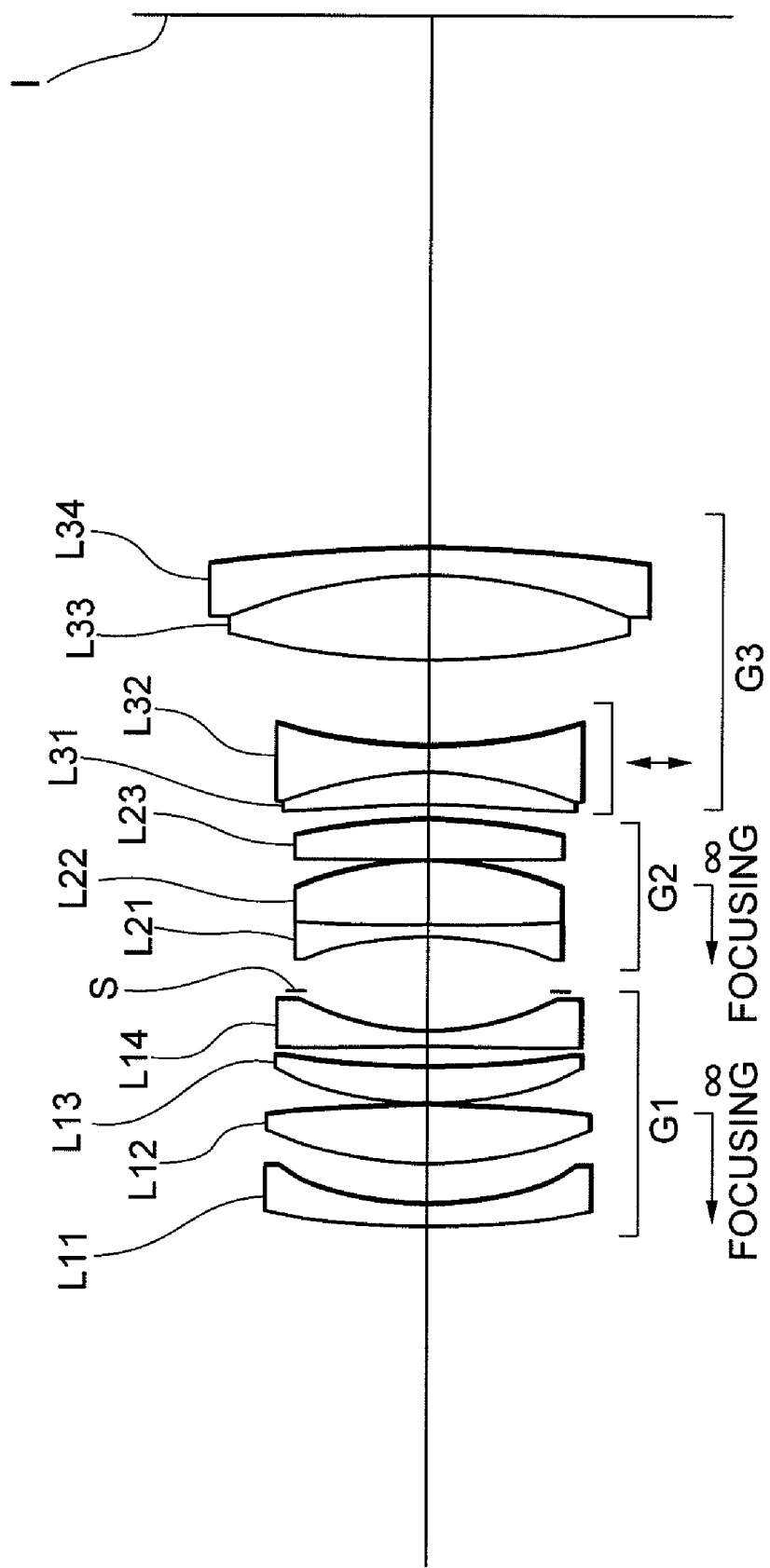
FIG. 7 is a sectional view showing a lens configuration of a macro lens according to Example 4 of a second embodiment.

FIG. 7 is a sectional view showing a lens configuration of a macro lens according to Example 4 of a second embodiment.

The macro lens according to Example 4 of the second embodiment is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a negative meniscus lens L14 having a convex surface facing the object.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

In the macro lens according to Example 4, an image blur caused by a camera shake is corrected by moving the cemented negative lens in the third lens group as a shift lens group in a direction perpendicular to the optical axis. In Example 4, since the number of lenses in the shift lens group is small, it is easy to move the shift lens group upon correcting the image blur.

Various values associated with the macro lens according to Example 4 are listed in Table 4.

In the macro lens according to Example 4, the vibration reduction coefficient is 1.330, and the focal length is 61.00 (mm), so that the moving amount of the cemented negative lens in the third lens group G3 for correcting a rotational camera shake of 0.5 degrees is 0.42 (mm).

TABLE 4

[Specifications]

f = 61.00
FNO = 2.88
2ω = 39.20
Y = 21.60
TL = 91.29

[Lens Data]

| i | r | d | nd | νd |
|---|---|---|---|---|
| 1 | 52.577 | 1.60 | 1.75500 | 52.29 |
| 2 | 20.990 | 3.00 | | |
| 3 | 25.493 | 4.50 | 1.81600 | 46.63 |

TABLE 4-continued

| 4 | −131.416 | 0.10 | | |
| 5 | 22.565 | 2.80 | 1.65160 | 58.54 |
| 6 | 56.814 | 1.50 | | |
| 7 | 638.364 | 1.10 | 1.62004 | 36.30 |
| 8 | 17.844 | (D8) | | |
| 9 | ∞ | 4.00 | Aperture Stop S | |
| 10 | −28.971 | 1.00 | 1.72825 | 28.46 |
| 11 | 182.076 | 4.80 | 1.69680 | 55.52 |
| 12 | −25.710 | 0.10 | | |
| 13 | 527.863 | 2.90 | 1.71700 | 47.93 |
| 14 | −49.997 | (D14) | | |
| 15 | −152.015 | 2.50 | 1.84666 | 23.78 |
| 16 | −29.039 | 2.00 | 1.80400 | 46.58 |
| 17* | 31.559 | 6.50 | | |
| 18 | 50.834 | 6.50 | 1.80400 | 46.58 |
| 19 | −37.670 | 2.00 | 1.84666 | 23.78 |
| 20 | −145.491 | (Bf) | | |

[Aspherical Data]
Surface Number: 17

κ = 1.0000
A4 = −2.47160E−06
A6 = −1.42350E−09
A8 = 0.00000E+00
A10 = 0.00000E+00

[Variable Distances]

| | Infinity | Close Distance |
|---|---|---|
| β = | 0.00 | −1.00 |
| D8 = | 3.20 | 6.08 |
| D14 = | 1.20 | 30.32 |
| Bf = | 40.00 | 40.00 |

[Values for Conditional Expressions]

fvr = −33.475
f12 = 41.950
(4): X1/X2 = 1.10
(5): |fvr|/f12 = 0.80
(6): D/f = 0.98

Figure 8A:
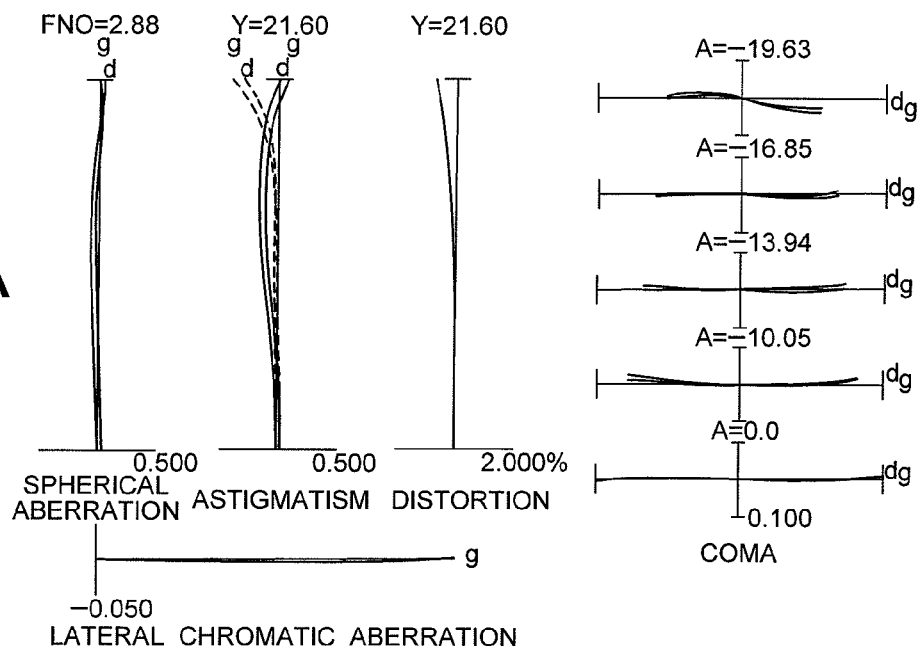
Figure 8B:
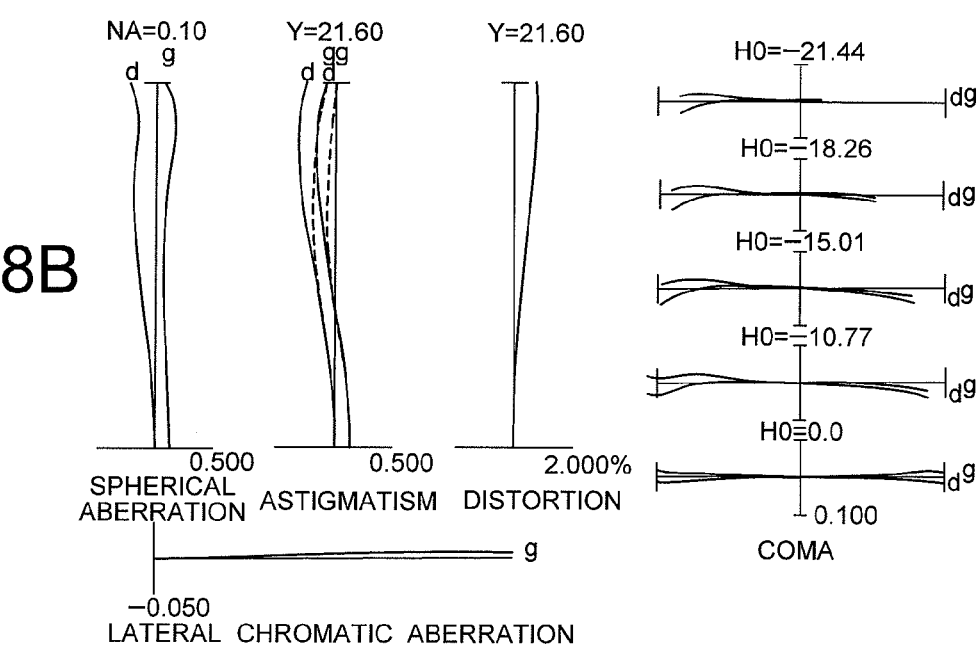

FIGS. 8A, and 8B are graphs showing various aberrations of the macro lens according to Example 4, in which FIG. 8A shows upon focusing on infinity (β=0.00), and FIG. 8B shows upon focusing on an object locating at a close distance (β=−1.00).

Figure 9A:
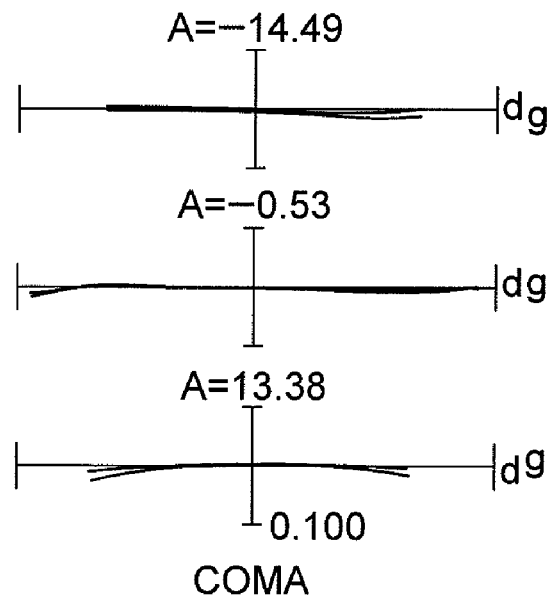
FIGS. 9A and 9B are graphs sowing coma of the macro lens according to Example 4, in which 9A shows upon correcting a rotational camera shake of 0.5 degrees upon focusing on an object locating at infinity ($\beta$=0.00)
Figure 9B:
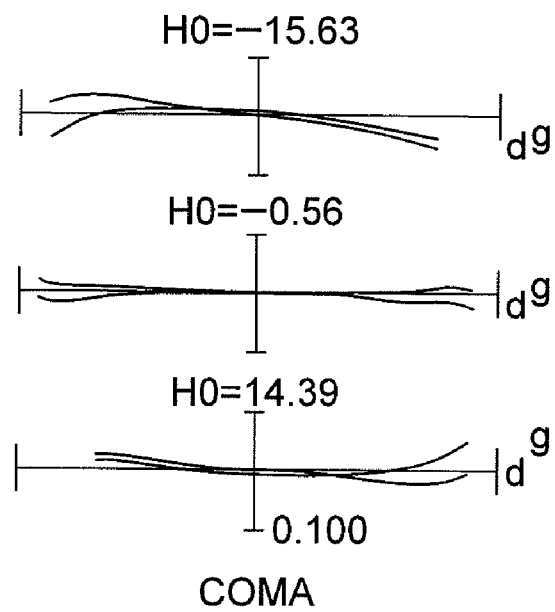

FIGS. 9A and 9B are graphs sowing coma of the macro lens according to Example 4, in which 9A shows upon correcting a rotational camera shake of 0.5 degrees upon focusing on infinity (β=0.00), and FIG. 9B shows upon correcting a rotational camera shake of 0.7 degrees upon focusing on an object locating at a close distance (β=−1.00).

As is apparent from the respective graphs, the macro lens according to Example 4 shows superb optical performance as a result of good corrections to various aberrations even upon vibration reduction.

Example 5

Figure 10:
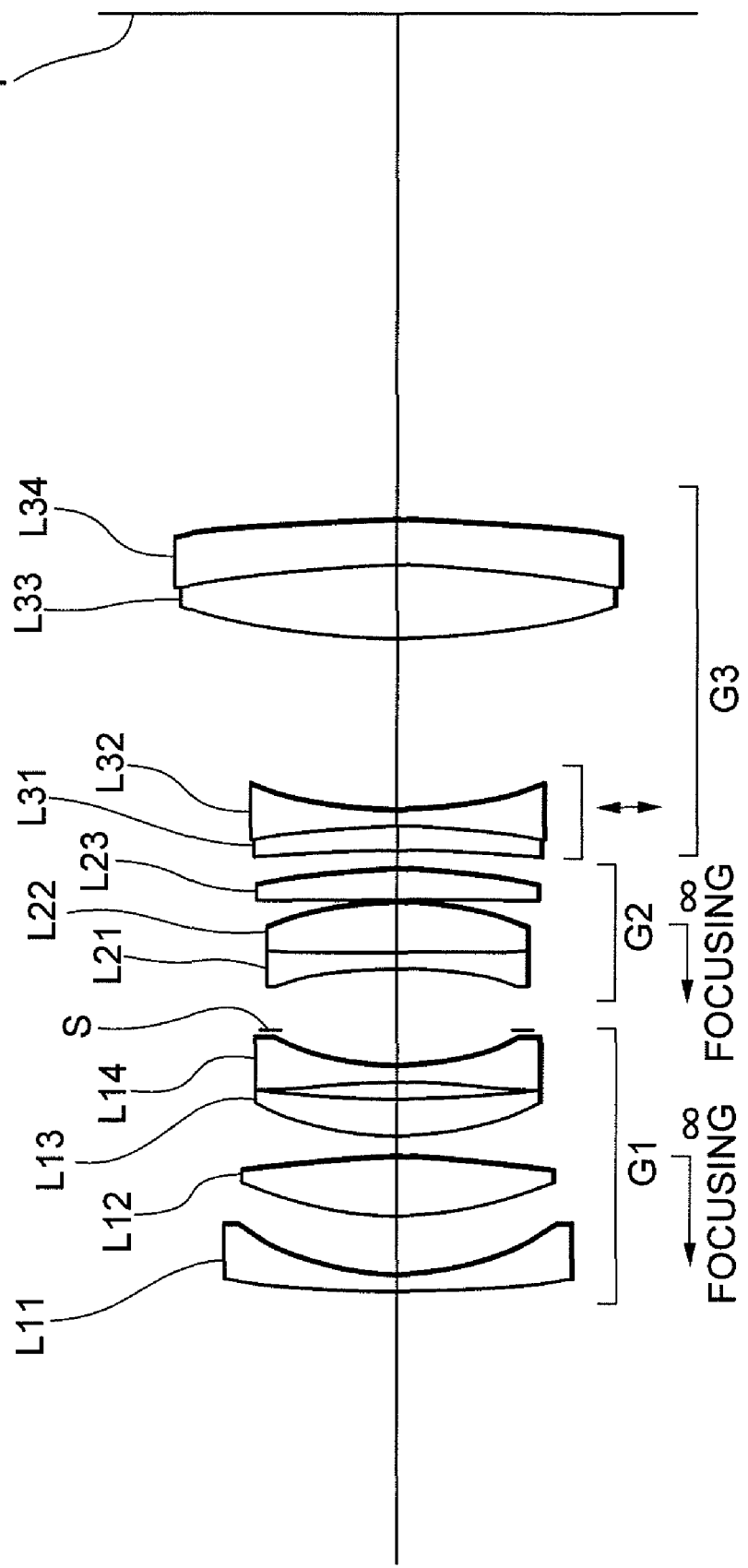
FIG. 10 is a sectional view showing a lens configuration of a macro lens according to Example 5 of the second embodiment.

FIG. 10 is a sectional view showing a lens configuration of a macro lens according to Example 5 of the second embodiment.

The macro lens according to Example 5 is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a double concave negative lens L14.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

In the macro lens according to Example 5, an image blur caused by a camera shake is corrected by moving the cemented negative lens in the third lens group as a shift lens group in a direction perpendicular to the optical axis. In Example 5, since the number of lenses in the shift lens group is small, it is easy to move the shift lens group upon correcting the image blur.

Various values associated with the macro lens according to Example 5 are listed in Table 5.

In the macro lens according to Example 5, the vibration reduction coefficient is 1.19, and the focal length is 62.00 (mm), so that the moving amount of the cemented negative lens in the third lens group G3 for correcting a rotational camera shake of 0.5 degrees is 0.45 (mm).

TABLE 5

[Specifications]

f = 62.00
FNO = 3.05
2ω = 38.80
Y = 21.60
TL = 96.29

[Lens Data]

| i | r | d | nd | νd |
|---|---|---|---|---|
| 1 | 77.161 | 1.20 | 1.62280 | 57.03 |
| 2 | 21.083 | 4.36 | | |
| 3 | 26.415 | 4.45 | 1.83400 | 37.17 |
| 4 | −94.687 | 1.59 | | |
| 5 | 23.149 | 2.88 | 1.60300 | 65.47 |
| 6 | 74.335 | 1.19 | | |
| 7 | −116.105 | 1.20 | 1.72825 | 28.46 |
| 8 | 20.056 | (D8) | | |
| 9 | ∞ | 4.47 | Aperture Stop S | |
| 10 | −38.008 | 1.20 | 1.78472 | 25.68 |
| 11 | 155.775 | 3.83 | 1.79500 | 45.30 |
| 12 | −28.126 | 0.20 | | |
| 13 | 317.461 | 2.26 | 1.81600 | 46.63 |
| 14 | −61.987 | (D14) | | |
| 15 | −209.108 | 1.84 | 1.84666 | 23.78 |
| 16 | −71.146 | 1.20 | 1.69680 | 55.52 |
| 17* | 30.031 | 13.06 | | |
| 18 | 51.485 | 5.55 | 1.62280 | 57.03 |
| 19 | −102.566 | 3.38 | 1.84666 | 23.78 |
| 20 | −155.457 | (Bf) | | |

[Aspherical Data]
Surface Number: 17

TABLE 5-continued

κ = 0.9487
A4 = −3.33720E−06
A6 = −4.30430E−09
A8 = 9.75350E−11
A10 = −5.93050E−13

[Variable Distances]

| | Infinity | Close Distance |
|---|---|---|
| β = | 0.00 | −1.00 |
| D8 = | 2.92 | 6.00 |
| D14 = | 1.50 | 27.22 |
| Bf = | 38.00 | 38.00 |

[Values for Conditional Expressions]

fvr = −39.586
f12 = 39.713
(4): X1/X2 = 1.12
(5): |fvr|/f12 = 1.00
(6): D/f = 1.02

Figure 11A:
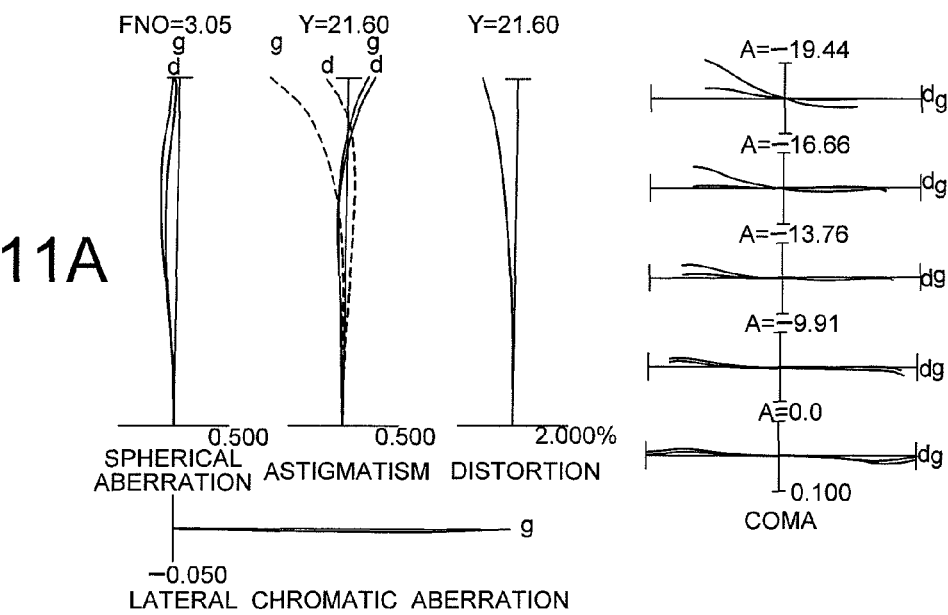
Figure 11B:
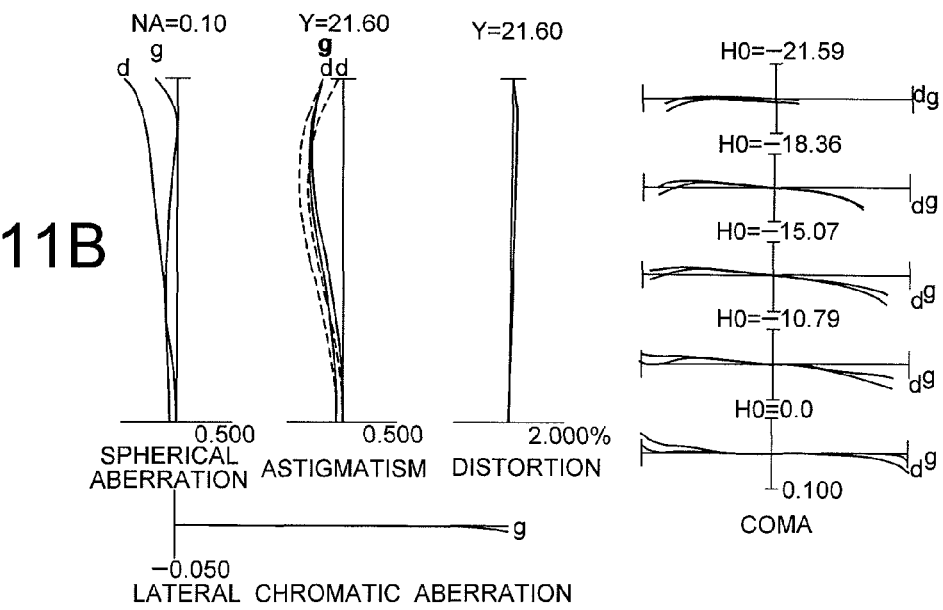

FIGS. 11A, and 11B are graphs showing various aberrations of the macro lens according to Example 5, in which FIG. 11A shows upon focusing on an object locating at infinity (β=0.00), and FIG. 11B shows upon focusing on an object locating at a close distance (β=−1.00).

Figure 12A:
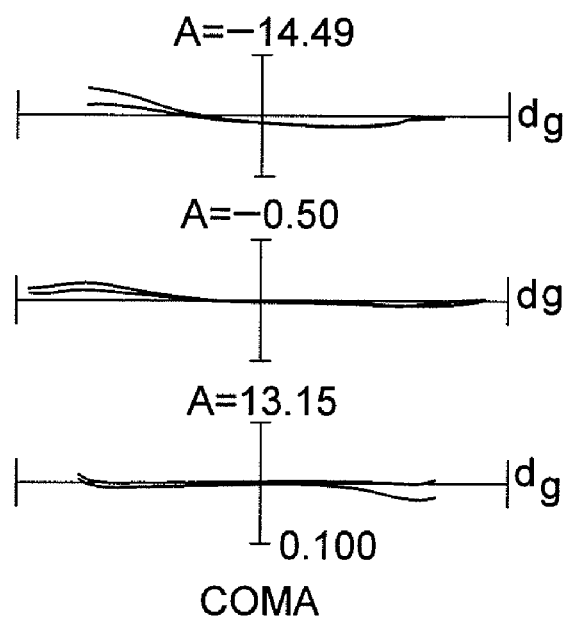
FIGS. 12A and 12B are graphs sowing coma of the macro lens according to Example 5, in which 12A shows upon correcting a rotational camera shake of 0.5 degrees upon focusing on an object locating at infinity ($\beta$=0.00)
Figure 12B:
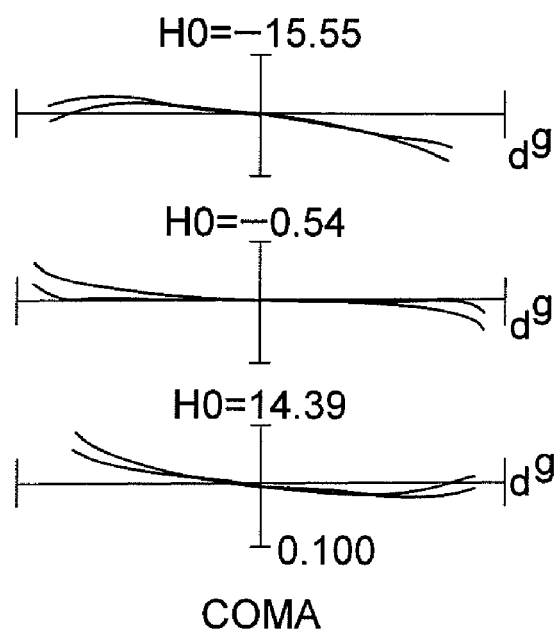

FIGS. 12A and 12B are graphs sowing coma of the macro lens according to Example 5, in which 12A shows upon correcting a rotational camera shake of 0.5 degrees upon focusing on an object locating at infinity (β=0.00), and FIG. 12B shows upon correcting a rotational camera shake of 0.7 degrees upon focusing on an object locating at a close distance (β=−1.00).

As is apparent from the respective graphs, the macro lens according to Example 5 shows superb optical performance as a result of good corrections to various aberrations even upon vibration reduction.

Example 6

FIG. 13 is a sectional view showing a lens configuration of a macro lens according to Example 6 of the second embodiment.

The macro lens according to Example 6 is composed of, in order from an object along an optical axis, a first lens group G1 having positive refractive power, an apertures stop S, a second lens group G2 having positive refractive power, and a third lens group G3 having negative refractive power.

Upon varying focusing from infinity to a close distance, the first lens group G1 and the second lens group G2 are moved to the object side such that a distance between the first lens group G1 and the second lens group G2 increases.

The first lens group G1 is composed of, in order from the object, a negative meniscus lens L11 having a convex surface facing the object, a double convex positive lens L12, a positive meniscus lens L13 having a convex surface facing the object, and a double concave negative lens L14.

The second lens group G2 is composed of, in order from the object, a cemented positive lens constructed by a double concave negative lens L21 cemented with a double convex positive lens L22, and a double convex positive lens L23.

The third lens group G3 is composed of, in order from the object, a cemented negative lens constructed by a positive meniscus lens L31 having a convex surface facing the image plane I side cemented with a double concave negative lens L32, and a cemented positive lens constructed by a double convex positive lens L33 cemented with a negative meniscus lens L34 having a convex surface facing the image plane I side. The image plane I side of the negative lens L32 is an aspherical surface.

In the macro lens according to Example 6, an image blur caused by a camera shake is corrected by moving the cemented negative lens in the third lens group as a shift lens group in a direction perpendicular to the optical axis. In Example 6, since the number of lenses in the shift lens group is small, it is easy to move the shift lens group upon correcting the image blur.

Various values associated with the macro lens according to Example 6 are listed in Table 6.

In the macro lens according to Example 6, the vibration reduction coefficient is 1.19, and the focal length is 62.20 (mm), so that the moving amount of the cemented negative lens in the third lens group G3 for correcting a rotational camera shake of 0.5 degrees is 0.47 (mm).

TABLE 6

[Specifications]

f = 62.20
FNO = 2.94
2ω = 38.70
Y = 21.60
TL = 95.55

[Lens Data]

| i | r | d | nd | νd |
|---|---|---|---|---|
| 1 | 50.155 | 1.20 | 1.81554 | 44.35 |
| 2 | 21.627 | 3.13 | | |
| 3 | 26.048 | 4.97 | 1.80440 | 39.57 |
| 4 | −92.734 | 1.95 | | |
| 5 | 24.946 | 2.82 | 1.60300 | 65.47 |
| 6 | 76.300 | 1.29 | | |
| 7 | −105.025 | 1.20 | 1.64769 | 33.79 |
| 8 | 21.392 | (D8) | | |
| 9 | ∞ | 2.38 | Aperture Stop S | |
| 10 | −28.665 | 1.20 | 1.72825 | 28.46 |
| 11 | 67.540 | 4.74 | 1.67790 | 50.70 |
| 12 | −26.943 | 0.20 | | |
| 13 | 644.209 | 2.60 | 1.78590 | 44.18 |
| 14 | −40.340 | (D14) | | |
| 15 | −136.790 | 2.62 | 1.75520 | 27.51 |
| 16 | −36.281 | 1.20 | 1.65100 | 56.17 |
| 17* | 29.881 | 11.92 | | |
| 18 | 49.534 | 8.38 | 1.63854 | 55.48 |
| 19 | −40.027 | 1.20 | 1.75692 | 31.59 |
| 20 | −133.204 | (Bf) | | |

[Aspherical Data]
Surface Number: 17

κ = 1.0423
A4 = −2.06620E−06
A6 = −1.82980E−08
A8 = 1.10000E−10
A10 = −2.62190E−13

[Variable Distances]

| | Infinity | Close Distance |
|---|---|---|
| β = | 0.00 | −1.00 |
| D8 = | 2.96 | 4.71 |
| D14 = | 1.10 | 28.53 |
| Bf = | 38.50 | 38.50 |

[Values for Conditional Expressions]

fvr = −40.597
f12 = 41.164
(4): X1/X2 = 1.06

TABLE 6-continued (5): |fvr|/f12 = 0.99
(6): D/f = 1.03

Figure 14A:
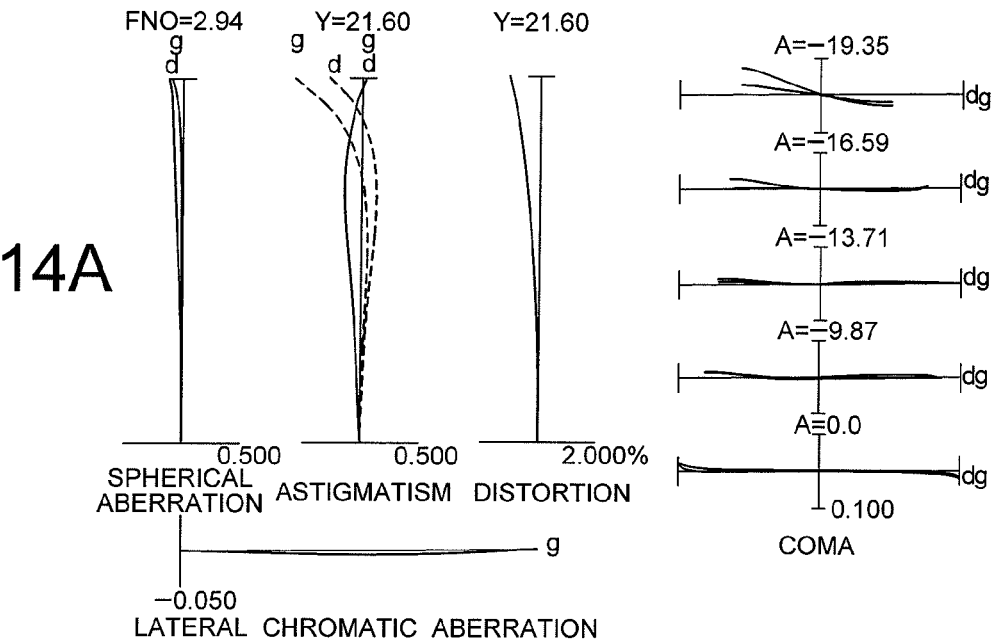
Figure 14B:
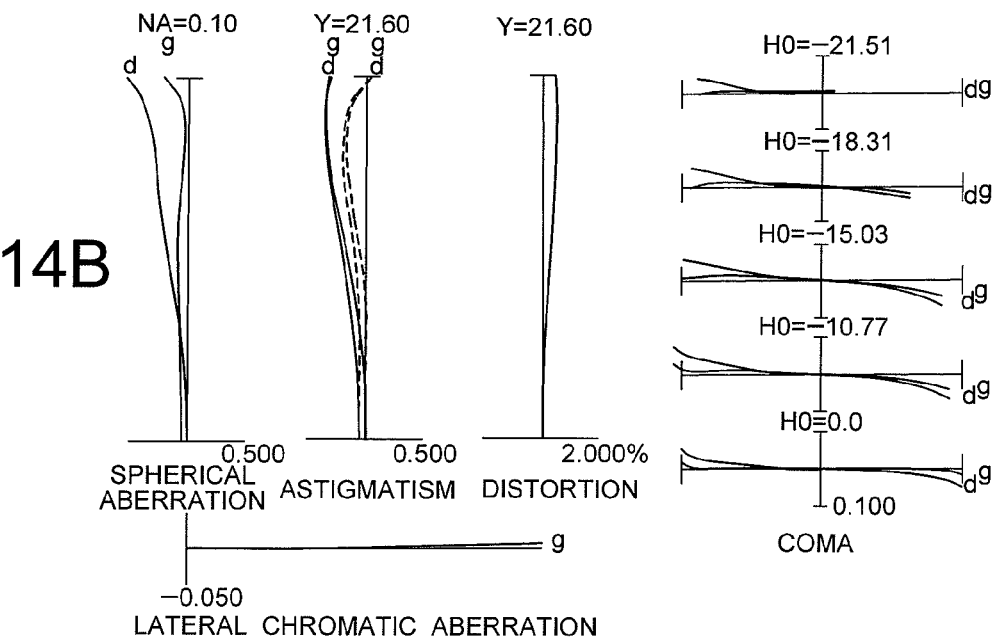

FIGS. 14A, and 14B are graphs showing various aberrations of the macro lens according to Example 6, in which FIG. 14A shows upon focusing on an object locating at infinity (β=0.00), and FIG. 14B shows upon focusing on an object locating at a close distance (β=−1.00).

Figure 15A:
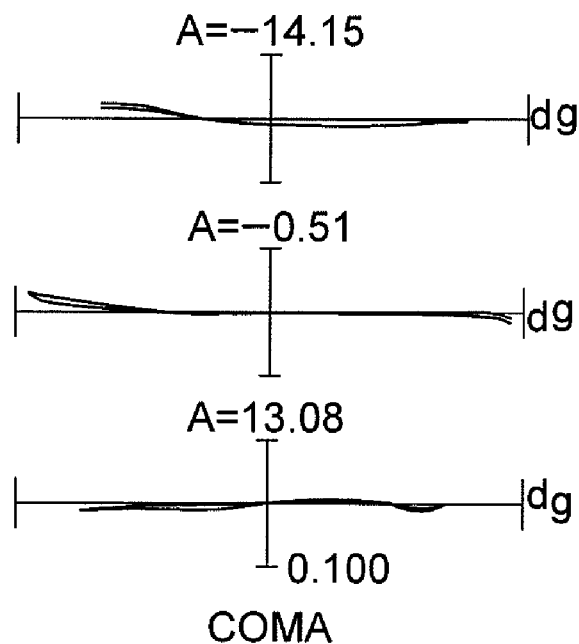
FIGS. 15A and 15B are graphs sowing coma of the macro lens according to Example 6, in which 15A shows upon correcting a rotational camera shake of 0.5 degrees upon focusing on an object locating at infinity ($\beta$=0.00)
Figure 15B:
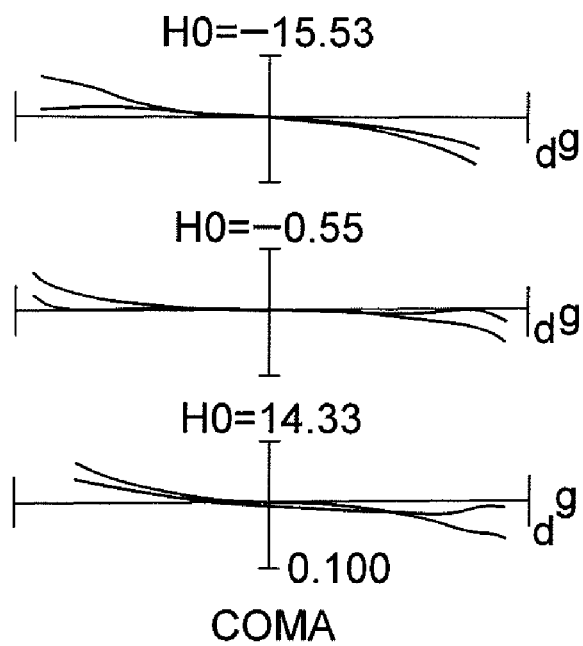

FIGS. 15A and 15B are graphs sowing coma of the macro lens according to Example 6, in which 15A shows upon correcting a rotational camera shake of 0.5 degrees upon focusing on infinity (β=0.00), and FIG. 15B shows upon correcting a rotational camera shake of 0.7 degrees upon focusing on an object locating at a close distance (β=−1.00).

As is apparent from the respective graphs, the macro lens according to Example 6 shows superb optical performance as a result of good corrections to various aberrations even upon vibration reduction.

Figure 18:
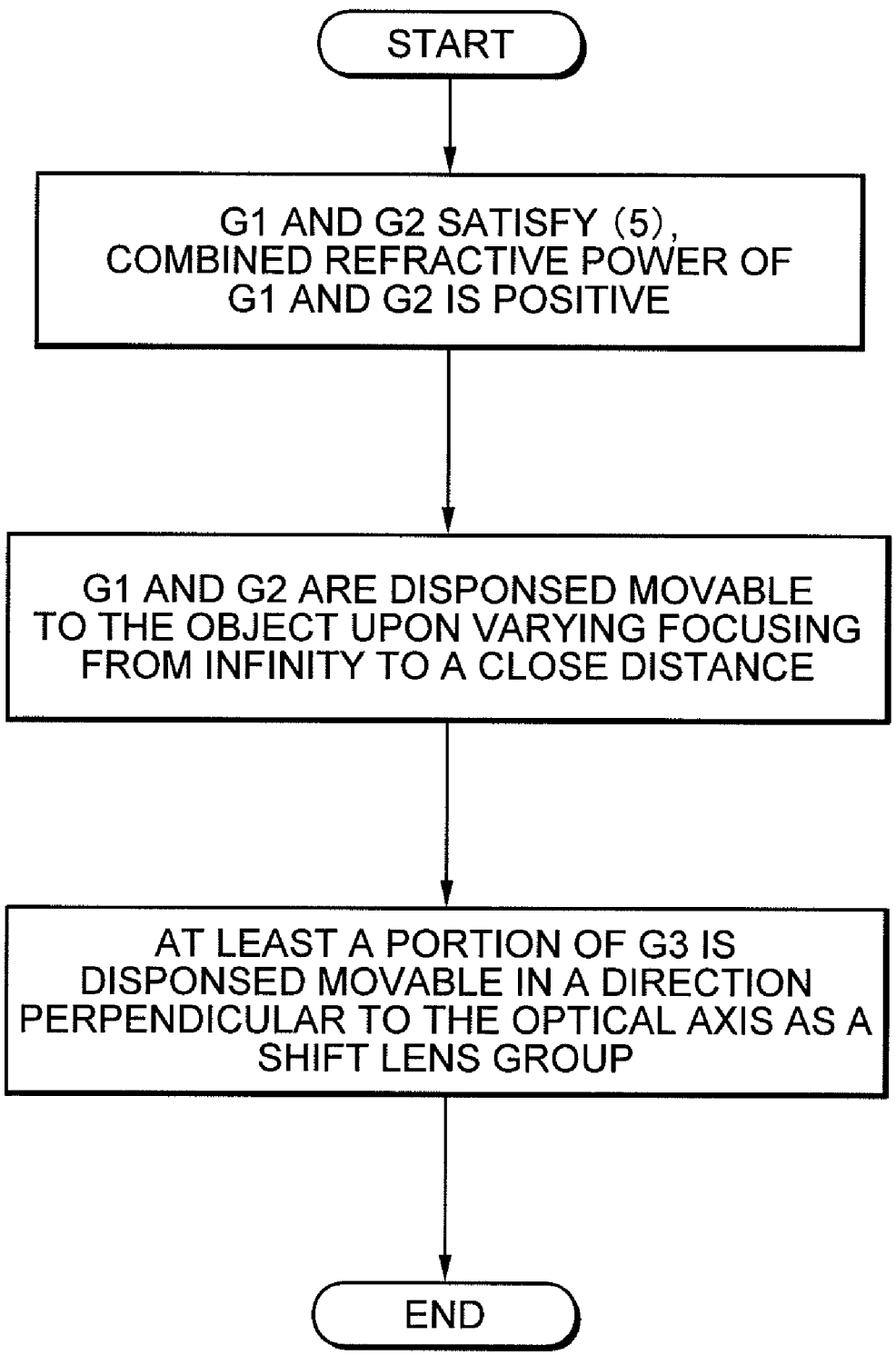
FIG. 18 is a flow chart showing a procedure of a method for manufacturing the macro lens according to the second embodiment.

An outline of a method for manufacturing the macro lens including, in order from an object, a first lens group G1, a second lens group G2, and a third lens group G3 is explained below with reference to FIG. 18.

At first, each lens of the first lens group G1, and the second lens group G2 is disposed in a lens barrel having cylindrical shape such that combined refractive power of the first lens group G1 and the second lens group G2 becomes positive, and each lens satisfies the following conditional expression (5):

$$0.72 < |fvr|/f12 < 1.50 \qquad (5)$$

where f12 denotes a combined focal length of the first lens group and the second lens group upon focusing on the object locating at infinity, and fvr denotes a focal length of the shift lens group.

Then, the first lens group G1 and the second lens group G2 are disposed movable to the object side upon varying focusing from infinity to a close distance.

Then, at least a portion of the third lens group G3 is disposed movable in a direction perpendicular to the optical axis as a shift lens group.

As described above, the second embodiment makes it possible to provide a compact macro lens having high optical performance over the entire focusing range from infinity to a close distance even upon vibration reduction suitable for a single-lens reflex camera and a digital camera.

Then, a camera equipped with the macro lens according to Example 1 of the first embodiment is explained below. Although a case where the macro lens according to Example 1 is installed into a camera is explained, the same result can be obtained by any other Examples either in the first embodiment or in the second embodiment.

Figure 16:
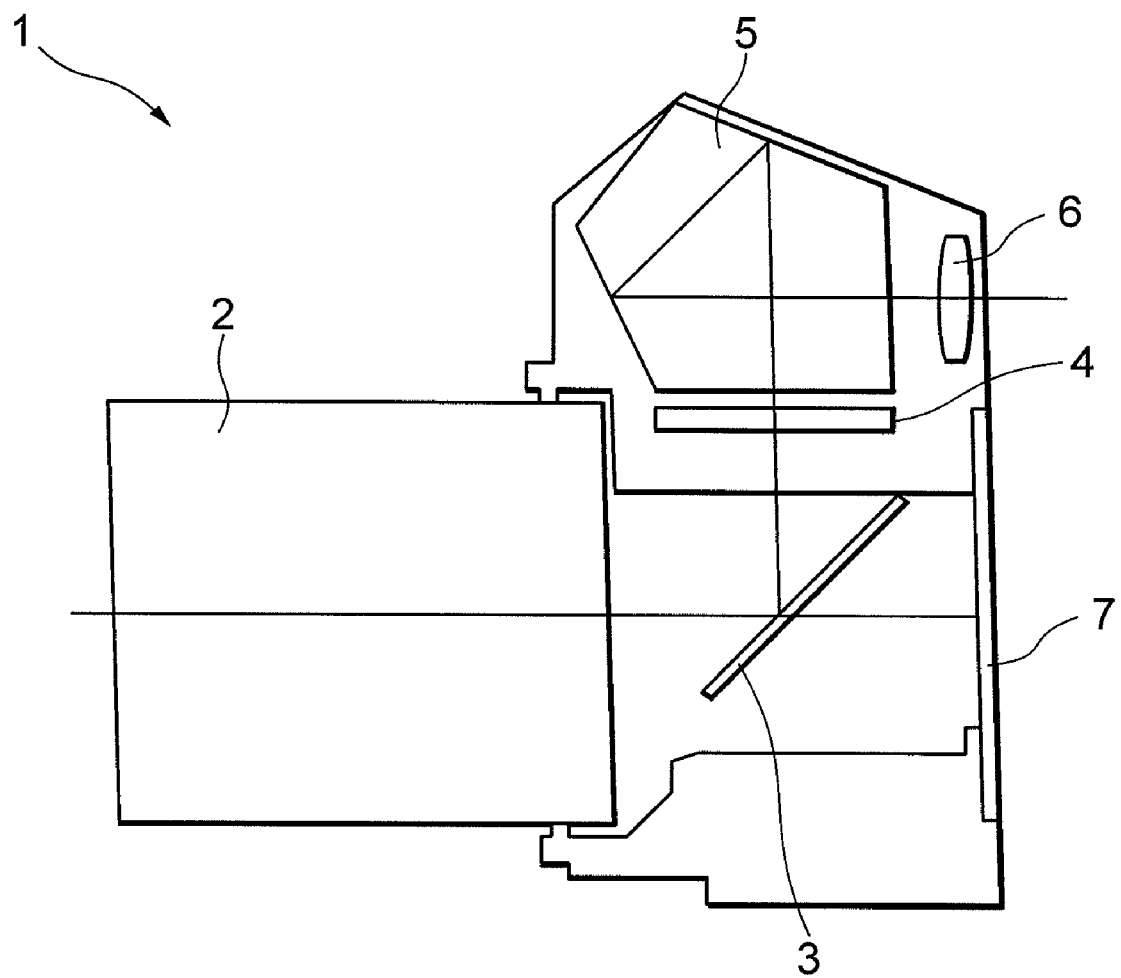
FIG. 16 is a diagram showing a camera equipped with the macro lens according to Example 1 of the first embodiment.

FIG. 16 is a schematic diagram showing a camera equipped with the macro lens according to Example 1 of the first embodiment.

As shown in FIG. 16, the camera 1 is a single-lens reflex digital camera equipped with the macro lens according to Example 1 as an image-taking lens 2. In the camera 1, light emitted from an object (not shown) is converged by an image-taking lens 2, and focused on a focusing screen 4 through a quick return mirror 3. The light focused on the focusing screen 4 is reflected a plurality of times by a pentagonal roof prism 5, and led to an eyepiece 6. Accordingly, a photographer can observe the object image as an erected image through the eyepiece 6.

When the photographer presses a shutter release button (not shown), the quick return mirror 3 is removed from an optical path, and the light from the object (not shown) reaches an imaging device 7. Accordingly, light from the object is captured by the imaging device 7 and stored in a memory (not shown) as an object image. In this manner, the photographer can take a picture of the object by the camera 1.

With installing the macro lens according to Example 1 into the camera 1 as an image-taking lens 2, it becomes possible to realize a camera having high optical performance.

Incidentally, the following description may suitably be applied within limits that do not deteriorate optical performance.

Although a three-lens-group configuration is shown in each Example of the present embodiment, the present embodiment can be applied to other lens-group configurations such as a four-lens-group configuration, and a five-lens-group configuration.

In each Example, in order to vary focusing from infinity to a close distance, a portion of a lens group, a single lens group, or a plurality of lens groups may be moved along the optical axis.

The focusing lens group(s) may be used for auto focus, and suitable for being driven by a motor such as an ultrasonic motor. It is preferable that the first lens group and the second lens group are used as the focusing lens group.

A lens group or a portion of a lens group may be sifted in a direction perpendicular to the optical axis as a vibration reduction lens group for correcting an image blur caused by a camera shake. It is particularly preferable that at least a portion of the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the vicinity of the second lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A lens system comprising, in order from an object:
   a first lens group;
   a second lens group; and
   a third lens group;
   combined refractive power of the first lens group and the second lens group being positive,
   the first lens group and the second lens group being movable to an object side for varying focusing from infinity to a close distance,
   each lens group including at least one positive lens and at least one negative lens, and
   the following conditional expressions being satisfied:

$$0.40 < f12/f < 0.75$$
   $$2.00 < f1/f2 < 8.00$$

where f denotes a focal length of the lens system, f12 denotes a combined focal length of the first lens group and the second lens group upon focusing on the object locating at infinity, f1 denotes a focal length of the first lens group, and f2 denotes a focal length of the second lens group,
   wherein the third lens group includes, in order from the object, a front lens group having negative refractive power, and a rear lens group having positive refractive power.

2. The lens system according to claim 1, wherein refractive power of the first lens group is positive, and refractive power of the second lens group is positive.

3. The lens system according to claim 1, wherein the following conditional expression is satisfied:

$$0.30 < X2/(f \times \beta) < 0.55$$

where X2 denotes a moving amount of the second lens group upon varying focusing from infinity to the close distance in which X2 is positive upon moving to the image plane side, and β denotes imaging magnification upon focusing on an object locating at the close distance.

4. The lens system according to claim 1, wherein refractive power of the third lens group is negative.

5. The lens system according to claim 1, wherein the front lens group includes a cemented negative lens constructed by a positive lens cemented with a negative lens.

6. The lens system according to claim 1, wherein the third lens group includes an aspherical surface.

7. The lens system according to claim 1, wherein the following conditional expression is satisfied:

$$1.00 \leq X1/X2 < 1.30$$

where X1 denotes a moving amount of the first lens group upon varying focusing from infinity to the close distance, and X2 denotes a moving amount of the second lens group upon varying focusing from infinity to the close distance, in which X1 and X2 are positive upon moving to the image plane side.

8. The lens system according to claim 1, wherein the first lens group includes the negative lens to the most object side.

9. The macro lens system according to claim 1, wherein an aperture stop is disposed between the first lens group and the third lens group.

10. An optical apparatus equipped with the lens system according to claim 1.

11. A lens system comprising, in order from an object:
    a first lens group;
    a second lens group; and
    a third lens group;
    combined refractive power of the first lens group and the second lens group being positive,
    the first lens group and the second lens group being movable to the object side for varying focusing from infinity to a close distance,
    at least a portion of the third lens group being movable in a direction perpendicular to an optical axis as a shift lens group, and
    the following conditional expression being satisfied:

$$0.72 < |fvr|/f12 < 1.50$$

where f12 denotes a combined focal length of the first lens group and the second lens group upon focusing on the object locating at infinity, and fvr denotes a focal length of the shift lens group.

12. The lens system according to claim 11, wherein the following conditional expression is satisfied:

$$0.83 < D/f < 1.40$$

where f denotes a focal length of the lens system, and D denotes a distance between the most object side surface of the shift lens group and an image plane.

13. The lens system according to claim 11, wherein refractive power of the shift lens group in the third lens group is negative.

14. An optical apparatus equipped with the lens system according to claim 11.

15. A lens system comprising, in order from an object:
a first lens group;
a second lens group; and
a third lens group;
combined refractive power of the first lens group and the second lens group being positive,
the first lens group and the second lens group being movable to the object side for varying focusing from infinity to a close distance,
each lens group including at least one positive lens and at least one negative lens, and
the following conditional expressions being satisfied:

$$0.30 < X2/(f \times \beta) < 0.55$$

$$2.00 < f1/f2 < 8.00$$

where X2 denotes a moving amount of the second lens group upon varying focusing from infinity to the close distance in which X2 is positive upon moving to the image plane side, β denotes an imaging magnification upon focusing on the object locating at the close distance, f1 denotes a focal length of the first lens group, and f2 denotes a focal length of the second lens group.

16. A method for manufacturing a lens system that includes, in order from an object, a first lens group, a second lens group, and a third lens group, the method comprising steps of:
disposing a positive lens and a negative lens in each lens group;
disposing each lens in the first lens group and the second lens group in such manner that combined refractive power of the first lens group and the second lens group becomes positive, the following conditional expressions being satisfied:

$$0.40 < f12/f < 0.75$$

$$2.00 < f1/f2 < 8.00$$

where f denotes a focal length of the lens system, f12 denotes a combined focal length of the first lens group and the second lens group upon focusing on the object locating at infinity, f1 denotes a focal length of the first lens group, and f2 denotes a focal length of the second lens group; and
disposing the first lens group and the second lens group to be movable upon varying focusing from infinity to a close distance.

17. The method according to claim 16, further comprising a step of:
satisfying the following conditional expression:

$$0.30 < X2/(f \times \beta) < 0.55$$

where X2 denotes a moving amount of the second lens group upon varying focusing from infinity to the close distance in which X2 is positive upon moving to the image plane side, and β denotes imaging magnification upon focusing on an object locating at the close distance.

18. The method according to claim 16, further comprising a step of:
satisfying the following conditional expression:

$$1.00 \leq X1/X2 < 1.30$$

where X1 denotes a moving amount of the first lens group upon varying focusing from infinity to the close distance, and X2 denotes a moving amount of the second lens group upon varying focusing from infinity to the close distance, in which X1 and X2 are positive upon moving to the image plane side.

19. The method according to claim 16, further comprising steps of:
disposing at least a portion of the third lens group to be movable in a direction perpendicular to an optical axis as a shift lens group; and
satisfying the following conditional expression:

$$0.72 < |fvr|/f12 < 1.50$$

where f12 denotes a combined focal length of the first lens group and the second lens group upon focusing on the object locating at infinity, and fvr denotes a focal length of the shift lens group.

20. A method for manufacturing a lens system that includes, in order from an object, a first lens group, a second lens group, and a third lens group, the method comprising steps of:
disposing each lens in the first lens group and the second lens group in such manner that combined refractive power of the first lens group and the second lens group becomes positive; and
disposing at least a portion of the third lens group to be movable in a direction perpendicular to an optical axis as a shift lens group,
the following conditional expression being satisfied:

$$0.72 < |fvr|/f12 < 1.50$$

where f12 denotes a combined focal length of the first lens group and the second lens group upon focusing on the object locating at infinity, and fvr denotes a focal length of the shift lens group.

21. The method according to claim 20, further comprising a step of:
satisfying the following conditional expression:

$$0.83 < D/f < 1.40$$

where f denotes a focal length of the lens system, and D denotes a distance between the most object side surface of the shift lens group and an image plane.

* * * * *